United States Patent [19]

Ogata

[11] Patent Number: 4,786,153
[45] Date of Patent: Nov. 22, 1988

[54] LARGE-APERTURE MACRO LENS SYSTEM

[75] Inventor: Yasuji Ogata, Tokyo, Japan

[73] Assignee: Olympus Optical Co., Ltd., Tokyo, Japan

[21] Appl. No.: 17,672

[22] Filed: Feb. 24, 1987

[30] Foreign Application Priority Data

Feb. 24, 1986 [JP] Japan .................................. 61-37472

[51] Int. Cl.$^4$ .......................... G02B 9/00; G02B 15/00
[52] U.S. Cl. .................................... 350/463; 350/428; 350/430
[58] Field of Search ............... 350/463, 474, 476, 426, 350/427, 428, 430, 437, 255, 477, 454, 455, 456, 457, 453, 458, 464, 465, 469, 431, 459, 460, 461, 473, 478, 429

[56] References Cited

FOREIGN PATENT DOCUMENTS

| 2427549 | 1/1975 | Fed. Rep. of Germany ...... 350/430 |
| 55-28038 | 2/1980 | Japan . |
| 56-107208 | 8/1981 | Japan . |
| 56-107210 | 8/1981 | Japan . |
| 57-192916 | 11/1982 | Japan . |
| 58-20006 | 4/1983 | Japan . |
| 152414 | 8/1984 | Japan .................................. 350/477 |
| 59-228220 | 12/1984 | Japan . |
| 60-100115 | 6/1985 | Japan . |

Primary Examiner—John K. Corbin
Assistant Examiner—Ronald M. Kachmarik
Attorney, Agent, or Firm—Cushman, Darby & Cushman

[57] ABSTRACT

A large-aperture macro lens system comprising a first lens group having positive refractive power, a second lens group having positive refractive power, and a third lens group having negative refractive power in the order from the object side and arranged that, when focusing on an object at the shortest object distance from the state that the lens system is focused on an object at the infinite distance, the airspace between the first and second lens groups is varied in a pattern that the above-mentioned airspace is increased and, then, decreased by changing the varying direction near the position of the intermediate photographing magnification while the airspace between the second and third lens groups is increased continuously, the large-apertured macro lens system being arranged that aberrations are corrected favourably over the whole range of object distance from the infinite distance up to the distance corresponding to the photographing magnification of 1x, variation of aberrations, especially, variation of spherical aberration is small, and the lens system is arranged to be compact and to be bright, the effective F-number thereof at the photographing magnification of 1x being small. i.e., 5.2.

11 Claims, 19 Drawing Sheets

LARGE-APERTURE MACRO LENS SYSTEM

BACKGROUND OF THE INVENTION (a) Field of the Invention

The present invention relates to a large-aperture macro lens system and, more particularly, to a large-aperture macro lens system which is capable of photographing an object at the infinite distance up to an object at a distance corresponding to the photographing magnification of 1× and which has a focal length of 50 mm and large aperture ratio, i.e., F/2.8.

(b) Description of the Priot Art

For photographic lens systems in general, aberrations are corrected so that the lens system displays the best performance when it is focused on an object at the infinite distance. On the other hand, for macro lens systems, a photographing magnification about 1/10× is used as the standard photographing magnification, and aberrations are corrected so that the performance of the lens system becomes favourable when it is focused on an object at a-distance corresponding to the standard photographing magnification.

However, in case of such macro lens systems, it is impossible to satisfactorily correct the variation of aberrations which occur according to the variation of the photographing magnification and, when the lens system is focused on an object at a distance shorter than the object distance corresponding to the standard photographing magnification, the lens system causes spherical aberration, coma, etc. largely. Especially, in case of a lens system such as, for example, Gauss type lens system which is arranged to be symmetrical in respect to the stop, there is general tendency that, as the photographing magnification is made higher, spherical aberration to be caused by rays of intermediate heights is undercorrected and spherical aberration to be caused by rays of the maximum height is overcorrected. As a result, the quality of image decreases considerably, and it is impossible to effectively utilize the strong point of a large aperture macro lens system. This is because paraxial rays, which go out from the lens components arranged in front of the stop and which are converging rays in respect to an object at the infinite distance, gradually come to a state close to the afocal state according to the variation of the photographing magnification and, at a photographing magnification about 1×, said paraxial rays become diverging rays. When this is examined from the view point of coefficients of aberrations, spherical aberration of the third order is undercorrected while spherical aberration of the fifth and seventh orders is considerably overcorrected. As a result, flare is caused and the quality of image decreases.

The above-mentioned problem is evident from the coefficients of spherical aberration of Embodiment 1 of a known macro lens system, which is disclosed in Japanese published examined patent application No. 20006/83, when the lens system as a whole is advanced. Said coefficients of aberration are as shown below.

|  | SA3 | SA5 | SA7 | Total |
| --- | --- | --- | --- | --- |
| Infinite Distance | −0.109 | +0.076 | +0.027 | −0.006 |
| −0.5X | −0.246 | +0.241 | +0.089 | +0.084 |
| −1.0X | −0.201 | +0.427 | +0.171 | +0.397 |

In the table shown in the above, values of respective coefficients of aberration correspond to values of lateral aberration on the image surface to be caused by paraxial rays of the maximum height. Here, reference symbol SA3 represents the coefficient of spherical aberration of the third order, reference symbol SA5 represents the coefficient of spherical aberration of the fifth order, and reference symbol SA7 represents the coefficient of spherical aberration of the seventh order.

The floating method is known as a means for correcting the variation of aberrations which occurs at the time of focusing on an object at a short distance as described in the above. Macro lens systems to which the floating method is applied are disclosed in Japanese published unexamined patent applications Nos. 28038/80, 107208/81, etc. Each of the above-mentioned known macro lens systems comprises two lens groups, i.e., a front lens group (a first lens group) located in front of a stop, and a rear lens group (a second lens group) located in rear of the stop. Another known macro lens system, which is disclosed in Japanese published unexamined patent application No. 192916/82, is arranged to comprise a front lens group (a first lens group) located in front of a stop, a rear lens group (a second lens group) located in rear of the stop, and a third lens group having positive refractive power which is added on the image side of said rear lens group, and still another known macro lens system, which is disclosed in Japanese published unexamined patent application No. 228220/84, is arranged to comprise a front lens group (a first lens group) located in front of a stop, a rear lens group (a second lens group) located in rear of the stop, and a third lens group having negative refractive power which is added on the image side of said rear lens group. Each of the known macro lens systems described so far is arranged that floating is carried out, when focusing on an object at a short distance, by varying an airspace between respective lens groups in the monotone increasing pattern.

The known macro lens systems described so far are respectively arranged that, when focusing on an object at the shortest object distance from the state that the lens system is focused on an object at the infinite distance, an airspace between respective lens groups is varied in the monotone increasing pattern so as to increase the heights of paraxial rays on a converging surface contained in the second lens group and to thereby cause undercorrected spherical aberration so that overcorrected spherical aberration to be caused by rays of the maximum height is offset by said undercorrected spherical aberration, and the variation of spherical aberration to be caused when focusing on an object at a short distance is thereby corrected. However, the above-mentioned method has disadvantages described below. That is, up to a photographing magnification about 1/2×, it is possible to correct spherical aberration favourably. However, at a photographing magnification about 1×, undercorrected spherical aberration occurs largely, flare is caused in the central portion of the image surface and, as a result, the quality of image becomes unfavourable. Moreover, the displacement of the image surface to be caused when the stop is stopped down becomes large. Furthermore, the advancing amount of the lens system at the time of focusing becomes large, and it is impossible to make the lens system compact.

Still another known macro lens system is disclosed in Japanese published unexamined patent application No. 100115/85. Said known macro lens system comprises a first lens group having positive refractive power, a second lens group having positive or negative refractive power, and a third lens group having positive refractive power and is arranged to perform floating, when focusing on an object at a short distance, by varying the airspace between the first and second lens groups in the monotone increasing pattern and varying the airspace between the second and third lens groups in such pattern that said airspace increases and, then, decreases.

Generally, when a macro lens system is focused on an object at a distance corresponding to the photographing magnification about 1×, the lens system advancing amount required becomes equal to the focal length of the lens system in the state that the lens system is focused on an object at the infinite distance. Therefore, even when the lens system is arranged compactly, the product provided with a lens system advancing mechanism does not become compact in most cases. In case of the above-mentioned known macro lens system disclosed in Japanese published unexamined patent application No. 100115/85, both of the first and second lens groups have positive refractive powers. Therefore, the photographing magnification available cannot be made higher than 1/2×, the lens system advancing amount for focusing is large, and it is impossible to obtain a compact lens system.

SUMMARY OF THE INVENTION

It is, therefore, a primary object of the present invention to provide a large-aperture macro lens system arranged that the performance thereof is favourable when focused on an object at a distance corresponding to the photographing magnification of 1×, i.e., a large-aperture macro lens system arranged that spherical aberration is chiefly corrected favourably, the lens system advancing amount for focusing is small, the lens system as a whole is arranged compactly, and the effective F-number at the photographing magnification of 1× is small, i.e., the lens system is bright.

To attain said object of the present invention, the large-aperture macro lens system according to the present invention is arranged to comprise, in the order from the object side, a first lens group $G_1$ having positive refractive power, a second lens group $G_2$ having positive refractive power, and a third lens group $G_3$ having negative refractive power as illustrated by the basic lens configuration shown in FIG. 1, said large-aperture macro lens system being arranged that, when focusing on an object at the shortest object distance from the state that the lens system is focused on an object at the infinite distance, the airspace between the first lens group $G_1$ and second lens group $G_2$ is varied in a pattern that said airspace is increased and, then, decreased by changing the varying direction near the position of the intermediate photographing magnification while the airspace between the second lens group $G_2$ and third lens group $G_3$ is increased continuously.

That is, by arranging to vary the airspace between the first lens group $G_1$ and second lens group $G_2$ in a pattern that said airspace is increased and, then, decreased by changing the varying direction near the position of the intermediate photographing magnification, the present invention makes it possible to obtain a macro lens system arranged that the variation of spherical aberration is small and favourable performance is obtained up to the photographing magnification of 1× which is an object of the present invention.

Besides, the present invention makes it possible to obtain a compact macro lens system by giving negative refractive power to the third lens group $G_3$ and adequately selecting the value of said negative refractive power so as to thereby make the lens system advancing amount small.

When the photographing magnification is increased to 1×, the effective F-number becomes about twice as large as the F-number in the state that the lens system is focused on an object at the infinite distance and, therefore, it becomes inconvenient to use the lens system as a macro lens system. In the present invention, the negative refractive power of the third lens group $G_3$ is made strong to some extent so as to thereby make the effective F-number small so that a bright macro lens system is obtained.

The large-aperture macro lens system according to the present invention has characteristics described so far. To correct aberrations more favourably, it is preferable to arrange that the first lens group $G_1$ comprises at least one negative lens and that said macro lens system fulfills the following conditions:

(1) $1.7 < |f_3|/f < 10, f_3 < 0$ (1)

(2) $0 < \Delta D_1 < 2$ (2)

(3) $\nu_{1n} < 50$ (3)

(4) $n_{3n} < 1.65$ (4)

where, reference symbol f represents the focal length of the lens system as a whole, reference symbol $f_3$ represents the focal length of the third lens group $G_3$, reference symbol $\Delta D_1$ represents the difference between the largest value of the airspace between the first lens groups $G_1$ and second lens group $G_2$ and value of said airspace when focused on an object at a distance corresponding to the photographing magnification of 1×, reference symbol $\nu_{1n}$ represents Abbe's number of the negative lens constituting the first lens group $G_1$, and reference symbol $n_{3n}$ represents the refractive index of the negative lens constituting the third lens groups $G_3$.

The condition (1) is established in order to adequately select the refractive power of the third lens group $G_3$. If the refractive power of the third lens group $G_3$ is made weak to the degree that $|f_3|/f$ becomes larger than the upper limit of the condition (1), the lens system advancing amount at the photographing magnification of 1× becomes large. Besides, as the effective F-number becomes large and the lens system becomes dark, it is impossible to attain the object of the present invention. If the refractive power of the third lens group $G_3$ is made strong to the degree that $|f_3|/f$ become smaller than the lower limit of the condition (1), it is impossible to correct aberrations favourably, and the tolerance in decentering etc. at the time of manufacture and assembly becomes small.

The condition (2) relates to the amount of variation of the airspace between the first lens group $G_1$ and second lens group $G_2$. The macro lens system according to the present invention is characterized in that the airspace between the first lens group $G_1$, and second lens group $G_2$ is varied, when focusing on an object at a distance corresponding to the photographing magnification of 1× from the state that the lens system is focused on an object at the infinite distance, in a pattern that said airspace is increased and, then, decreased by changing the varying direction near the position of the intermediate photographing magnification. Reference symbol $\Delta D_1$ represents the difference between the value of the airspace between the first lens group $G_1$ and second lens group $G_2$ when said airspace becomes the largest and value of said airspace when the lens system is focused on an object at a distance corresponding to the photographing magnification of $1\times$. In other words, reference symbol $\Delta D_1$ represents the value of returning movement of the first lens group. If said airspace is varied to the degree that $\Delta D_1$ becomes larger than the upper limit of the condition (2), spherical aberration at the photographing magnification of $1\times$ is overcorrected and, moreover, coma becomes large. If $\Delta D_1$ is made smaller than the lower limit of the condition (2), the airspace between the first lens group $G_1$ and second lens group $G_2$ varies in the monotone increasing pattern and, consequently, undercorrected spherical aberration becomes large.

The condition (3) defines Abbe's number of the negative lens constituting the first lens group $G_1$. If the condition (3) is not fulfilled, it is impossible to correct lateral chromatic aberration at the photographing magnification about $1/2\times$.

The condition (4) defines the refractive index of the negative lens constituting the third lens group $G_3$ (said negative lens corresponds to the sixth lens component in respective embodiments shown later). If the condition (4) is not fulfilled, Petzval's sum becomes too large, and curvature of field is undercorrected considerably.

For the large-aperture macro lens system according to the present invention, it is preferable to further fulfill the condition (5) shown below:

(5) $\quad 0.5 < |r_a|/f < 1.0$ \hfill (5)

where, reference symbol $r_a$ represents the radius of curvature of the surface having the strongest diverging action out of respective surfaces in the third lens group G.

The condition (5) shown in the above is required for correction of coma. When the afore-mentioned condition (2) is fulfilled, it is possible to prevent coma from occurring to some extent. However, when the curvature of the above-mentioned surface is made weak to the degree that $|r_a|/f$ becomes larger than the upper limit of the conditions (5), the correcting action for coma becomes weak. When the curvature of said surface is made strong to the degree that $|r_a|/f$ becomes smaller than the lower limit of the condition (5), the curve of curvature of field curves largely.

For the large-aperture macro lens system according to the present invention, it is preferable to further fulfill the condition (6) shown below:

(6) $\quad 1.7 < n_2$ \hfill (6)

where, reference symbol $n_2$ represents the refractive index of the second lens component.

If the refractive index $n_2$ of the second lens component is made smaller than the lower limit of the condition (6), the curve of spherical aberration curves largely even when focused on an object at the infinite distance.

DETAILED DESCRIPTION OF THE PREFERRED EMBODIMENTS

Figure 1:
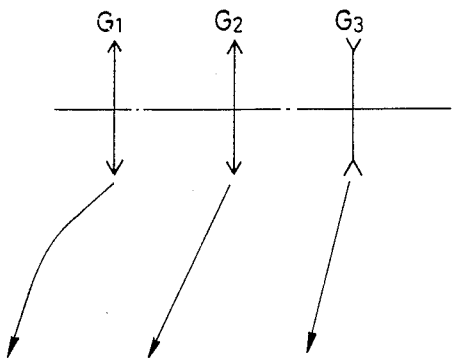
FIG. 1 shows the basic lens composition of the large-aperture macro lens system according to the present invention.

Now, preferred embodiments of the large-aperture macro lens system according to the present invention are shown below.

| Embodiment 1 $f = 51.5, \quad F/2.80 \sim F/5.10, \quad 2\omega = 45.5°$ | | | |
|---|---|---|---|
| $r_1 = 71.9126$ | | | |
| $d_1 = 2.5631$ | | $n_1 = 1.72916$ | $\nu_1 = 54.68$ |
| $r_2 = -171.0158$ | | | |
| $d_2 = 0.1350$ | | | |
| $r_3 = 19.7855$ | | | |
| $d_3 = 3.1449$ | | $n_2 = 1.77250$ | $\nu_2 = 49.66$ |
| $r_4 = 34.9886$ | | | |
| $d_4 = 0.7600$ | | | |
| $r_5 = 93.2117$ | | | |
| $d_5 = 1.2822$ | | $n_3 = 1.58267$ | $\nu_3 = 46.33$ |
| $r_6 = 16.3528$ | | | |
| $d_6 = D_1$ | | | |
| $r_7 = -18.8909$ | | | |
| $d_7 = 3.0858$ | | $n_4 = 1.75520$ | $\nu_4 = 27.51$ |
| $r_8 = 206.0456$ | | | |
| $d_8 = 5.0491$ | | $n_5 = 1.77250$ | $\nu_5 = 49.66$ |
| $r_9 = -23.1076$ | | | |
| $d_9 = 0.1650$ | | | |
| $r_{10} = 47.7170$ | | | |
| $d_{10} = 3.2747$ | | $n_6 = 1.77250$ | $\nu_6 = 49.66$ |
| $r_{11} = -139.1554$ | | | |
| $d_{11} = D_2$ | | | |
| $r_{12} = -377.3011$ | | | |
| $d_{12} = 1.5000$ | | $n_7 = 1.51633$ | $\nu_7 = 64.15$ |
| $r_{13} = 31.4655$ | | | |
| $d_{13} = 1.6000$ | | | |
| $r_{14} = 315.7777$ | | | |
| $d_{14} = 2.6094$ | | $n_8 = 1.58267$ | $\nu_8 = 46.33$ |
| $r_{15} = -73.0544$ | | | |
| | | $D_1$ | $D_2$ |
| Infinite Distance | | 6.291 | 0.990 |
| $-0.5X$ | | 10.016 | 3.412 |
| $-1.0X$ | | 9.016 | 7.868 |
| the stop is arranged 3 mm in front of the seventh surface ($r_7$) | | | |
| $|f_3|/f = 2.597, \quad \Delta D_1 = 1.081$ | | | |

| Embodiment 2 $f = 51.5, \quad F/2.83 \sim F/5.11, \quad 2\omega = 45.5°$ | | | |
|---|---|---|---|
| $r_1 = 70.3184$ | | | |
| $d_1 = 2.5451$ | | $n_1 = 1.71700$ | $\nu_1 = 47.94$ |
| $r_2 = -153.3443$ | | | |
| $d_2 = 0.1350$ | | | |
| $r_3 = 19.1789$ | | | |
| $d_3 = 3.1500$ | | $n_2 = 1.78590$ | $\nu_2 = 44.18$ |
| $r_4 = 34.3091$ | | | |
| $d_4 = 0.6800$ | | | |
| $r_5 = 83.1414$ | | | |
| $d_5 = 1.2990$ | | $n_3 = 1.60342$ | $\nu_3 = 38.01$ |
| $r_6 = 15.4390$ | | | |
| $d_6 = D_1$ | | | |
| $r_7 = -16.4628$ | | | |

-continued

| | | |
|---|---|---|
| $d_7 = 2.5017$ | $n_4 = 1.75520$ | $\nu_4 = 27.51$ |
| $r_8 = -155.4760$ | | |
| $d_8 = 5.0909$ | $n_5 = 1.77250$ | $\nu_5 = 49.66$ |
| $r_9 = -20.4045$ | | |
| $d_9 = 0.1650$ | | |
| $r_{10} = 48.3531$ | | |
| $d_{10} = 3.1648$ | $n_6 = 1.71300$ | $\nu_6 = 53.84$ |
| $r_{11} = -99.7993$ | | |
| $d_{11} = D_2$ | | |
| $r_{12} = 153.8758$ | | |
| $d_{12} = 1.5900$ | $n_7 = 1.60729$ | $\nu_7 = 59.38$ |
| $r_{13} = 30.8977$ | | |
| $d_{13} = 1.8300$ | | |
| $r_{14} = 171.8386$ | | |
| $d_{14} = 2.6597$ | $n_8 = 1.60342$ | $\nu_8 = 38.01$ |
| $r_{15} = -135.5035$ | | |
| | $D_1$ | $D_2$ |
| Infinite Distance | 6.900 | 0.727 |
| −0.5X | 10.820 | 2.496 |
| −1.0X | 10.620 | 6.935 | the stop is arranged 3.3 mm in front of the seventh surface ($r_7$)
$|f_3|/f = 2.630$, $\Delta D_1 = 0.389$ Embodiment 3
$f = 51.5$, $F/2.8 \sim F/5.19$, $2\omega = 45.5°$

| | | |
|---|---|---|
| $r_1 = 148.9792$ | | |
| $d_1 = 2.5631$ | $n_1 = 1.72916$ | $\nu_1 = 54.68$ |
| $r_2 = -100.8477$ | | |
| $d_2 = 0.1350$ | | |
| $r_3 = 19.6669$ | | |
| $d_3 = 3.1449$ | $n_2 = 1.77250$ | $\nu_2 = 49.66$ |
| $r_4 = 46.5278$ | | |
| $d_4 = 1.0165$ | | |
| $r_5 = 370.0493$ | | |
| $d_5 = 1.2822$ | $n_3 = 1.58267$ | $\nu_3 = 46.33$ |
| $r_6 = 16.1179$ | | |
| $d_6 = D_1$ | | |
| $r_7 = -17.9561$ | | |
| $d_7 = 2.0000$ | $n_4 = 1.75520$ | $\nu_4 = 27.51$ |
| $r_8 = -359.3300$ | | |
| $d_8 = 4.0000$ | $n_5 = 1.77250$ | $\nu_5 = 49.66$ |
| $r_9 = -21.1552$ | | |
| $d_9 = 0.1650$ | | |
| $r_{10} = 58.7760$ | | |
| $d_{10} = 3.2747$ | $n_6 = 1.77250$ | $\nu_6 = 49.66$ |
| $r_{11} = -74.8374$ | | |
| $d_{11} = D_2$ | | |
| $r_{12} = -303.7594$ | | |
| $d_{12} = 1.5000$ | $n_7 = 1.51633$ | $\nu_7 = 64.15$ |
| $r_{13} = 34.8188$ | | |
| $d_{13} = 1.8245$ | | |
| $r_{14} = -379.9382$ | | |
| $d_{14} = 2.5841$ | $n_8 = 1.56732$ | $\nu_8 = 42.83$ |
| $r_{15} = -57.1724$ | | |
| | $D_1$ | $D_2$ |
| Infinite Distance | 6.291 | 0.990 |
| −0.5X | 10.152 | 4.715 |
| −1.0X | 10.127 | 8.399 | the stop is arranged 3 mm in front of the seventh surface ($r_7$)
$|f_3|/f = 2.569$, $\Delta D_1 = 0.327$ Embodiment 4
$f = 51.5$, $F/2.86 \sim F/5.17$, $2\omega = 45.5°$

| | | |
|---|---|---|
| $r_1 = 61.2176$ | | |
| $d_1 = 2.5000$ | $n_1 = 1.72000$ | $\nu_1 = 50.25$ |
| $r_2 = -213.6049$ | | |
| $d_2 = 0.1500$ | | |
| $r_3 = 18.2860$ | | |
| $d_3 = 3.0000$ | $n_2 = 1.78590$ | $\nu_2 = 44.18$ |
| $r_4 = 29.1936$ | | |
| $d_4 = 0.7200$ | | |
| $r_5 = 60.8301$ | | |
| $d_5 = 1.2400$ | $n_3 = 1.58144$ | $\nu_3 = 40.75$ |
| $r_6 = 14.7356$ | | |
| $d_6 = D_1$ | | |
| $r_7 = -18.2868$ | | |
| $d_7 = 2.7400$ | $n_4 = 1.76180$ | $\nu_4 = 27.11$ |
| $r_8 = 278.6021$ | | |
| $d_8 = 5.3000$ | $n_5 = 1.77250$ | $\nu_5 = 49.66$ |
| $r_9 = -22.8068$ | | |
| $d_9 = 0.1500$ | | |
| $r_{10} = 43.1647$ | | |
| $d_{10} = 2.9111$ | $n_6 = 1.72000$ | $\nu_6 = 50.25$ |
| $r_{11} = -122.2355$ | | |
| $d_{11} = D_2$ | | |
| $r_{12} = -5146.8708$ | | |
| $d_{12} = 1.4000$ | $n_7 = 1.51633$ | $\nu_7 = 64.15$ |
| $r_{13} = 30.3529$ | | |
| $d_{13} = 2.0800$ | | |
| $r_{14} = -398.4014$ | | |
| $d_{14} = 2.4100$ | $n_8 = 1.58144$ | $\nu_8 = 40.75$ |
| $r_{15} = -53.6950$ | | |
| | $D_1$ | $D_2$ |
| Infinite Distance | 6.900 | 0.727 |
| −0.5X | 10.589 | 2.336 |
| −1.0X | 9.990 | 6.107 | the stop is arranged 3.3 mm in front of the seventh surface ($r_7$)
$|f_3|/f = 2.734$, $\Delta D_1 = 0.721$ Embodiment 5
$f = 51.5$, $F/2.89 \sim F/5.51$, $2\omega = 45.5°$

| | | |
|---|---|---|
| $r_1 = 107.4559$ | | |
| $d_1 = 2.5631$ | $n_1 = 1.72916$ | $\nu_1 = 54.68$ |
| $r_2 = -134.0176$ | | |
| $d_2 = 0.1350$ | | |
| $r_3 = 18.5240$ | | |
| $d_3 = 3.1449$ | $n_2 = 1.77250$ | $\nu_2 = 49.66$ |
| $r_4 = 35.1161$ | | |
| $d_4 = 0.8000$ | | |
| $r_5 = 131.5691$ | | |
| $d_5 = 1.2822$ | $n_3 = 1.58267$ | $\nu_3 = 46.33$ |
| $r_6 = 15.8882$ | | |
| $d_6 = D_1$ | | |
| $r_7 = -15.1976$ | | |
| $d_7 = 1.8825$ | $n_4 = 1.75520$ | $\nu_4 = 27.51$ |
| $r_8 = -359.3300$ | | |
| $d_8 = 3.5481$ | $n_5 = 1.78590$ | $\nu_5 = 44.18$ |
| $r_9 = -17.9921$ | | |
| $d_9 = 0.1650$ | | |
| $r_{10} = 80.9828$ | | |
| $d_{10} = 3.2747$ | $n_6 = 1.77250$ | $\nu_6 = 49.66$ |
| $r_{11} = -102.7116$ | | |
| $d_{11} = D_2$ | | |
| $r_{12} = 102.5518$ | | |
| $d_{12} = 1.5000$ | $n_7 = 1.51633$ | $\nu_7 = 64.15$ |
| $r_{13} = 38.6024$ | | |
| $d_{13} = 1.0000$ | | |
| $r_{14} = 160.0516$ | | |
| $d_{14} = 2.5841$ | $n_8 = 1.56732$ | $\nu_8 = 42.83$ |
| $r_{15} = -231.2026$ | | |
| | $D_1$ | $D_2$ |
| Infinite Distance | 9.900 | 1.533 |
| −0.5X | 11.247 | 3.259 |
| −1.0X | 10.248 | 14.177 | the stop is arranged 3.3 mm in front of the seventh surface ($r_7$)
$|f_3|/f = 8.680$, $\Delta D_1 = 1.359$ Embodiment 6
$f = 51.5$, $F/2.8 \sim F/5.22$, $2\omega = 45.5°$

| | | |
|---|---|---|
| $r_1 = 40.5017$ | | |
| $d_1 = 3.6069$ | $n_1 = 1.72916$ | $\nu_1 = 54.68$ |
| $r_2 = 1165.0549$ | | |
| $d_2 = 0.1350$ | | |
| $r_3 = 18.9963$ | | |
| $d_3 = 3.1449$ | $n_2 = 1.77250$ | $\nu_2 = 49.66$ |
| $r_4 = 29.6782$ | | |
| $d_4 = 1.4000$ | | |
| $r_5 = 90.0652$ | | |
| $d_5 = 1.7000$ | $n_3 = 1.65016$ | $\nu_3 = 39.39$ |
| $r_6 = 12.8155$ | | |
| $d_6 = D_1$ | | |
| $r_7 = -11.5012$ | | |
| $d_7 = 1.8500$ | $n_4 = 1.80518$ | $\nu_4 = 25.43$ |
| $r_8 = -14.3165$ | | |
| $d_8 = 0.1500$ | | |
| $r_9 = 62.8013$ | | |
| $d_9 = 4.0000$ | $n_5 = 1.72916$ | $\nu_5 = 54.68$ |
| $r_{10} = -24.7292$ | | |
| $d_{10} = D_2$ | | |
| $r_{11} = -118.5352$ | | |

-continued

| | | | |
|---|---|---|---|
| $d_{11} = 1.4000$ | $n_6 = 1.58144$ | $\nu_6 = 40.75$ | |
| $r_{12} = 31.9202$ | | | |
| $d_{12} = 1.6000$ | | | |
| $r_{13} = -392.9991$ | | | |
| $d_{13} = 3.1440$ | $n_7 = 1.58913$ | $\nu_7 = 60.97$ | |
| $r_{14} = -37.2800$ | | | |

| | $D_1$ | $D_2$ |
|---|---|---|
| Infinite Distance | 8.302 | 0.600 |
| −0.5X | 8.823 | 2.417 |
| −1.0X | 8.802 | 6.206 | the stop is arranged 4 mm in front of
the seventh surface ($r_7$)
$|f_3|/f = 2.579$, $\Delta D = 0.128$ In respective embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

Figure 2:
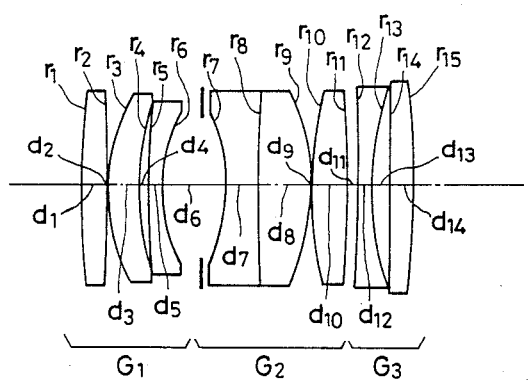
FIG. 2 shows a sectional view of Embodiments 1 through 5 of the present invention.

Embodiments 1 through 5 respectively have the seven-component eight-element lens configuration as shown in FIG. 2. Each of said Embodiments 1 through 5 comprises a first lens group $G_1$, a second lens group $G_2$, and a third lens group $G_3$ in the order from the object side wherein said first lens group $G_1$ comprises a positive lens, a positive meniscus lens which is convex toward the object side, and a negative meniscus lens which is concave toward the image side, said second lens group $G_2$ comprises a cemented dublet, which comprises a negative lens element and a positive lens element, and a positive lens, and said third lens group $G_3$ comprises a negative lens and a positive lens. In said Embodiments 1 through 5, $\nu_{1n}$ given in the condition (3) corresponds to $\nu_3$, $n_{3n}$ given in the condition (4) corresponds to $n_7$, and $r_a$ given in the condition (5) corresponds to $r_{13}$.

Figure 3:
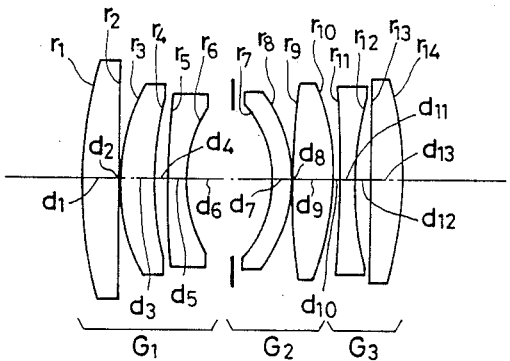
FIG. 3 shows a sectional view of Embodiment 6 of the present invention.

Embodiment 6 has the seven-component seven-element lens configuration as shown in FIG. 3. In said Embodiment 6, the first lens group $G_1$ and third lens group $G_3$ respectively have lens configurations similar to those of Embodiments 1 through 5 while the second lens group $G_2$ comprises a negative meniscus lens, which is concave toward the object side, and a positive lens. In said Embodiment 6, $\nu_{1n}$ given in the condition (3) corresponds to $\nu_3$, $n_{3n}$ given in the condition (4) corresponds to $n_6$, and $r_a$ given in the condition (5) corresponds to $r_{12}$.

Coefficients of spherical aberration of respective embodiments described so far are given in the table below. In said table, values in the column of (−1.0X) respectively show coefficients of aberration obtained when the macro lens system according to the present invention is focused on an object at a distance corresponding to the photographing magnification of 1× by varying the airspace $D_1$ in the monotone increasing pattern. Values of $D_1$ and $D_2$ at that time are as given in the table below.

| Embodiment 1 | | | | |
|---|---|---|---|---|
| | Infinite Distance | −0.5X | −1.0X | (−1.0X) |
| SA3 | −0.018 | −0.062 | −0.123 | −0.152 |
| SA5 | 0.010 | 0.040 | 0.067 | 0.048 |
| SA7 | 0.001 | 0.010 | 0.019 | 0.013 |
| Total | −0.007 | −0.012 | −0.037 | −0.091 |

$D_1 = 13.016$, $D_2 = 7.868$

| Embodiment 2 | | | | |
|---|---|---|---|---|
| SA3 | −0.022 | −0.055 | −0.113 | −0.151 |
| SA5 | 0.012 | 0.043 | 0.066 | 0.042 |
| SA7 | 0.000 | 0.011 | 0.020 | 0.013 |
| Total | −0.010 | −0.001 | −0.027 | −0.096 |

$D_1 = 14.620$, $D_2 = 6.935$

| Embodiment 3 | | | | |
|---|---|---|---|---|
| SA3 | −0.058 | −0.090 | −0.131 | −0.187 |
| SA5 | 0.024 | 0.064 | 0.097 | 0.063 |
| SA7 | 0.006 | 0.020 | 0.030 | 0.019 |
| Total | −0.028 | −0.006 | −0.004 | −0.105 |

$D_1 = 14.127$, $D_2 = 8.399$

| Embodiment 4 | | | | |
|---|---|---|---|---|
| SA3 | −0.037 | −0.069 | −0.109 | −0.142 |
| SA5 | −0.017 | 0.055 | 0.085 | 0.062 |
| SA7 | 0.003 | 0.015 | 0.025 | 0.017 |
| Total | −0.017 | 0.001 | 0.001 | −0.063 |

$D_1 = 13.990$, $D_2 = 6.107$

| Embodiment 5 | | | | |
|---|---|---|---|---|
| SA3 | −0.014 | −0.058 | −0.081 | −0.120 |
| SA5 | 0.015 | 0.031 | 0.052 | 0.030 |
| SA7 | −0.001 | 0.007 | 0.015 | 0.008 |
| Total | 0.0 | −0.020 | −0.014 | −0.082 |

$D_1 = 14.248$, $D_2 = 14.177$

| Embodiment 6 | | | | |
|---|---|---|---|---|
| SA3 | −0.023 | −0.040 | −0.053 | −0.108 |
| SA5 | 0.057 | 0.061 | 0.051 | 0.018 |
| SA7 | −0.008 | −0.020 | −0.026 | −0.040 |
| Total | 0.026 | 0.001 | −0.028 | −0.130 |

$D_1 = 9.300$, $D_2 = 6.206$

Figure 4:
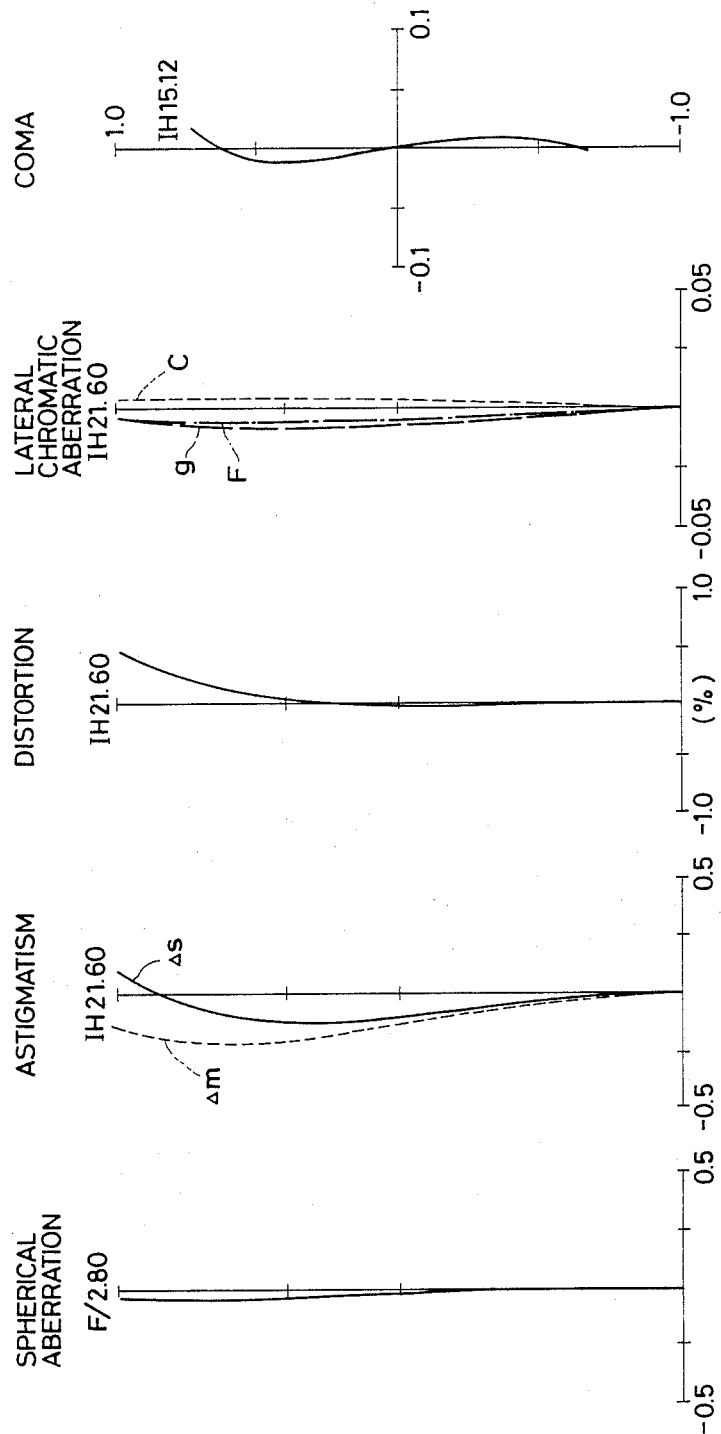
FIGS. 4 through 6 respectively show graphs illustrating aberration curves of Embodiment 1.
Figure 5:
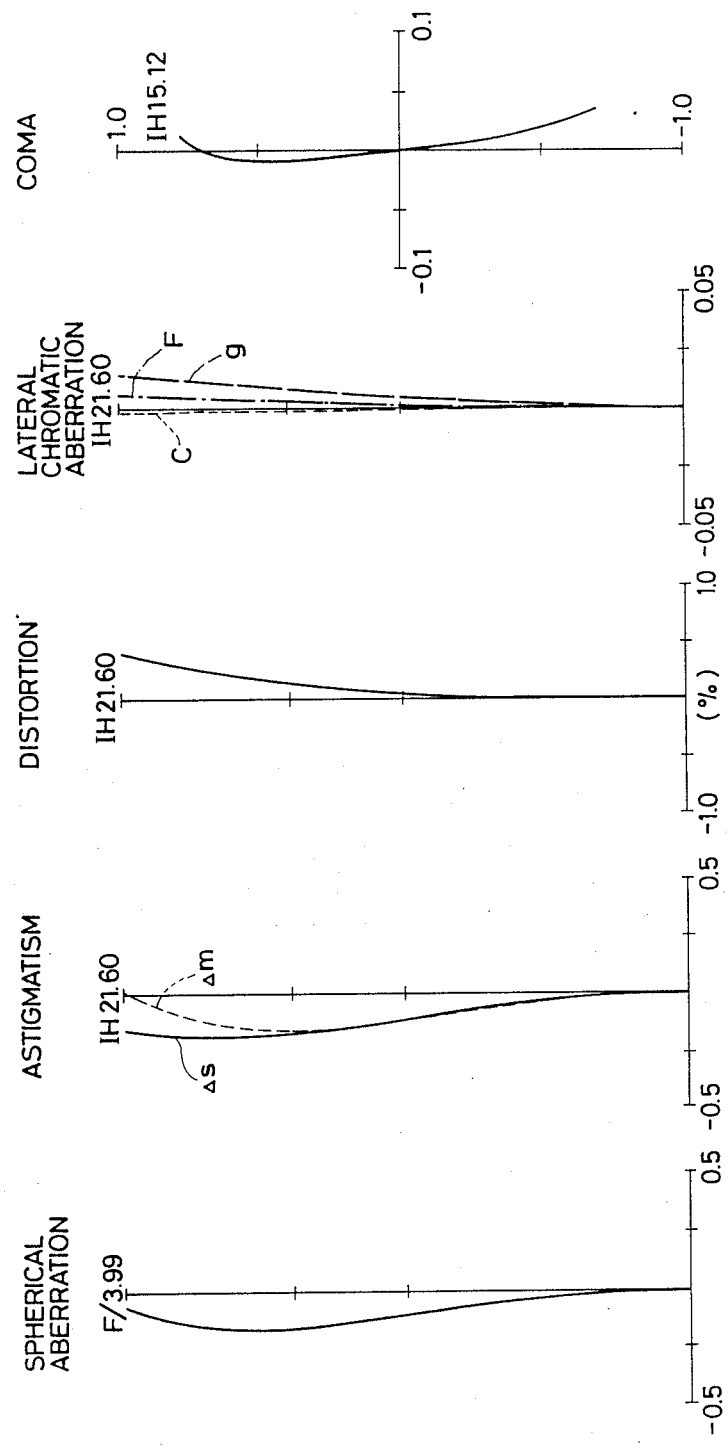
Figure 6:
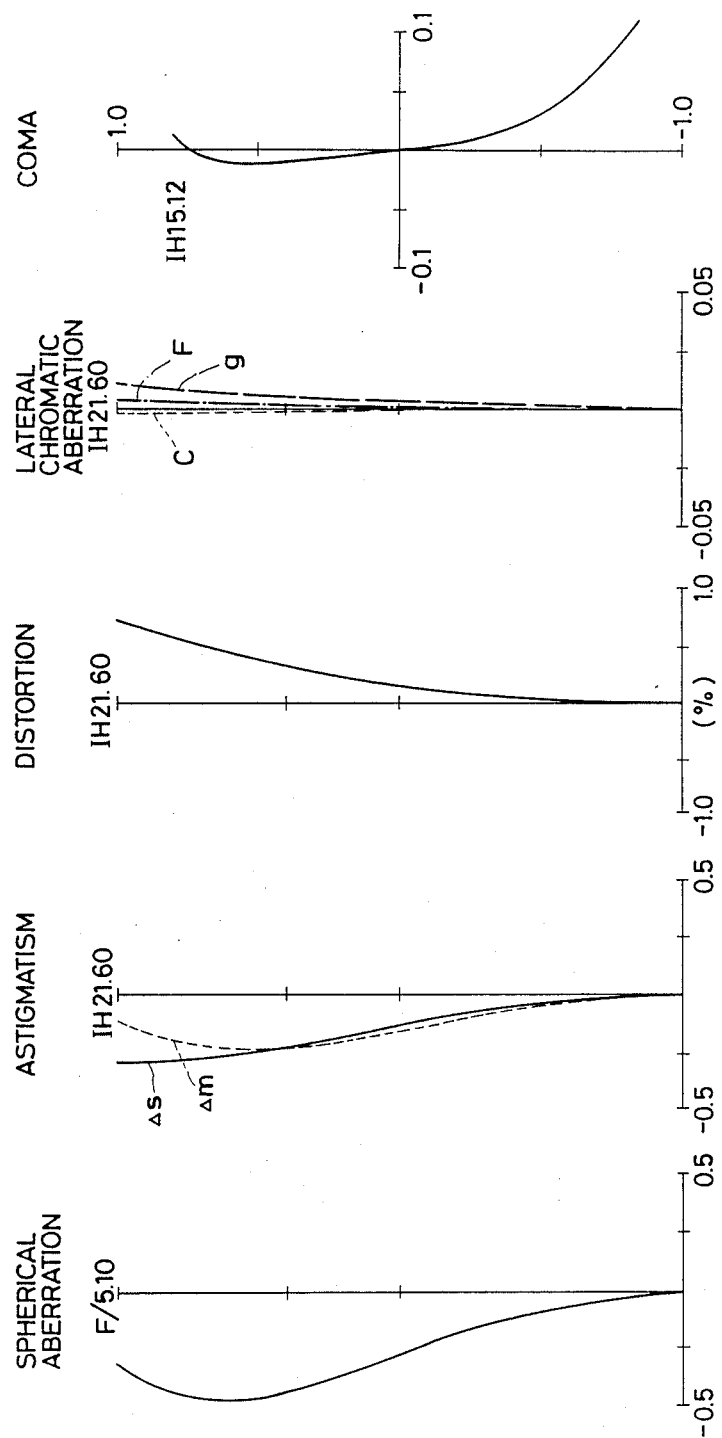
Figure 7:
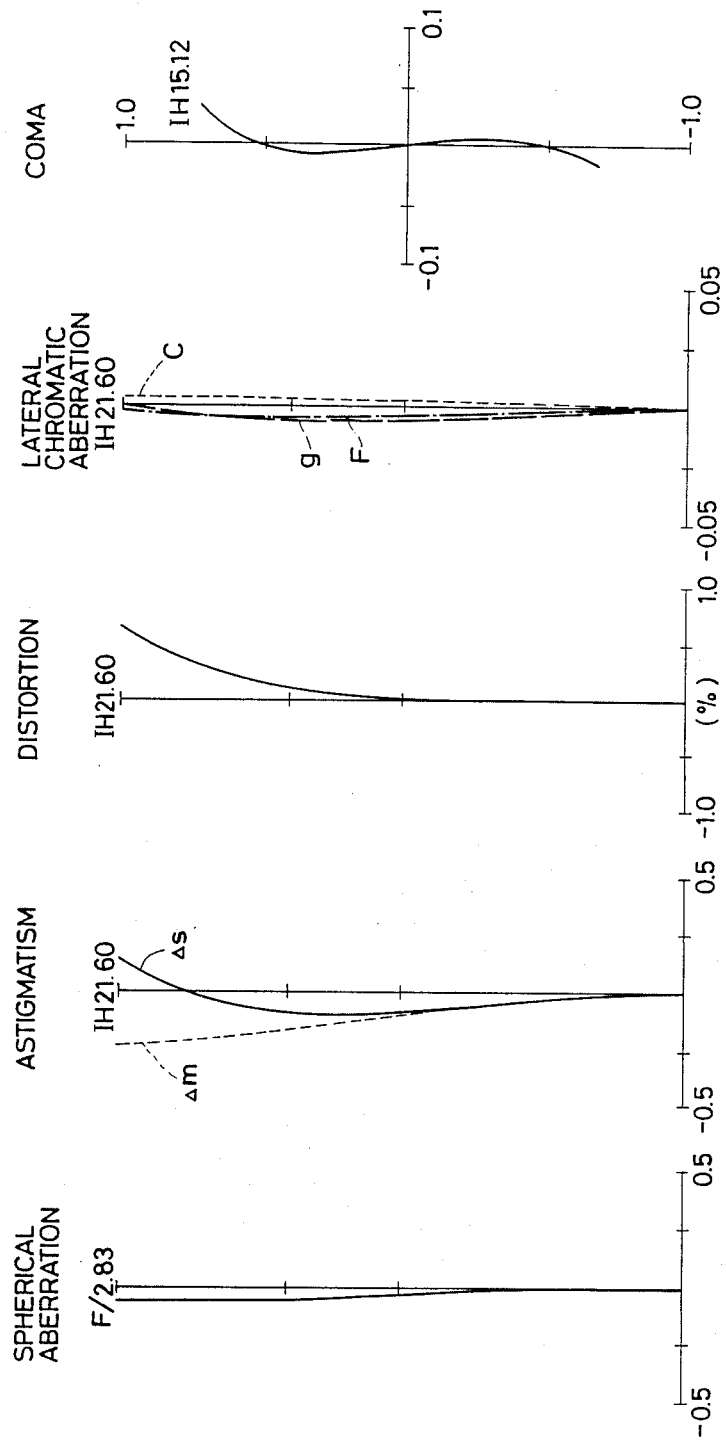
FIGS. 7 through 9 respectively show graphs illustrating aberration curves of Embodiment 2.
Figure 8:
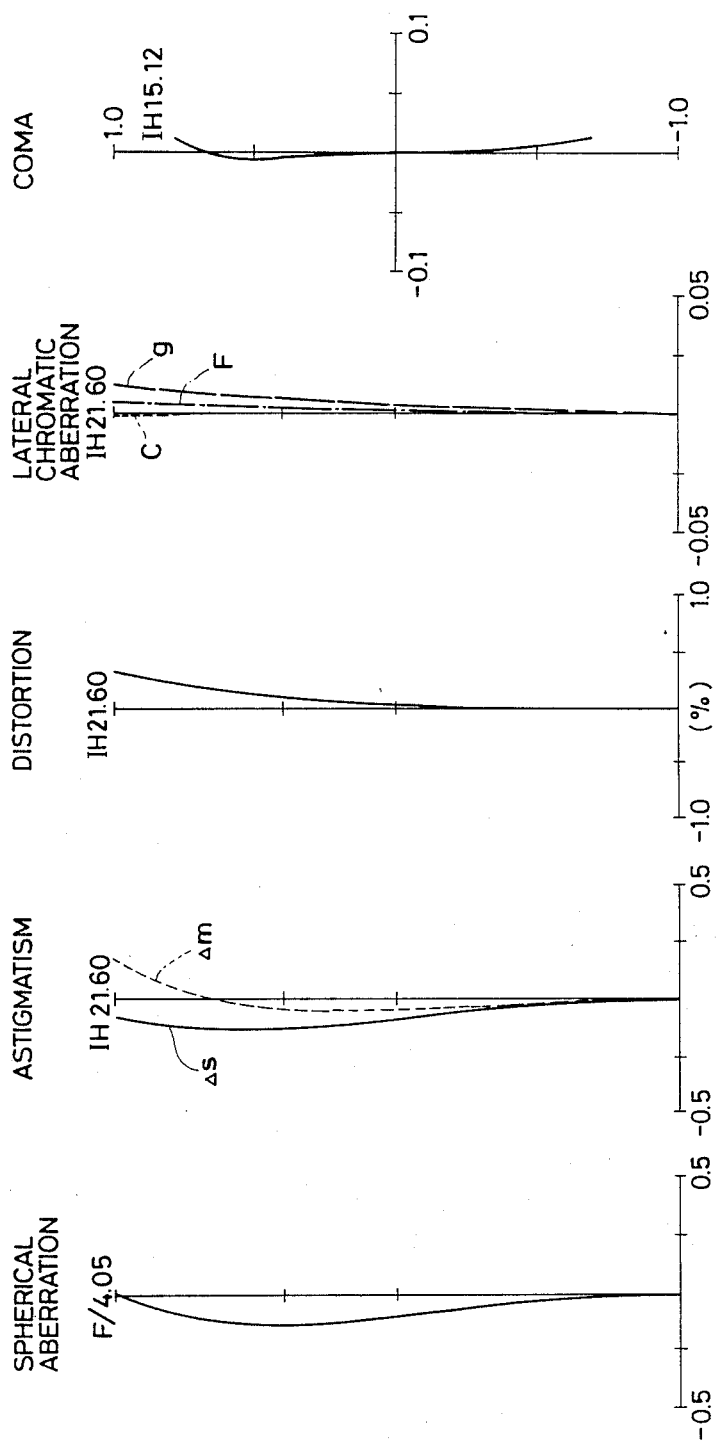
Figure 9:
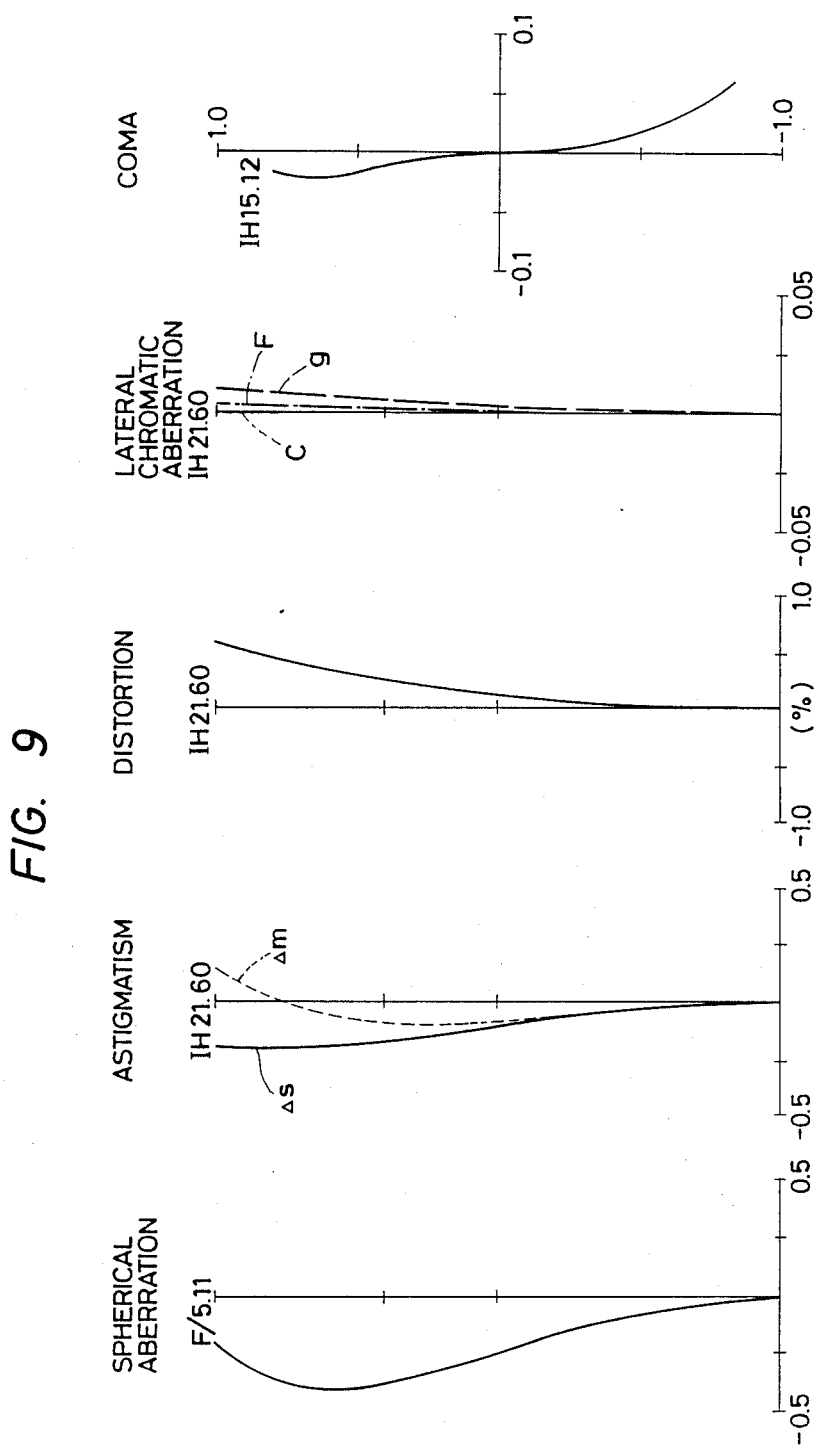
Figure 10:
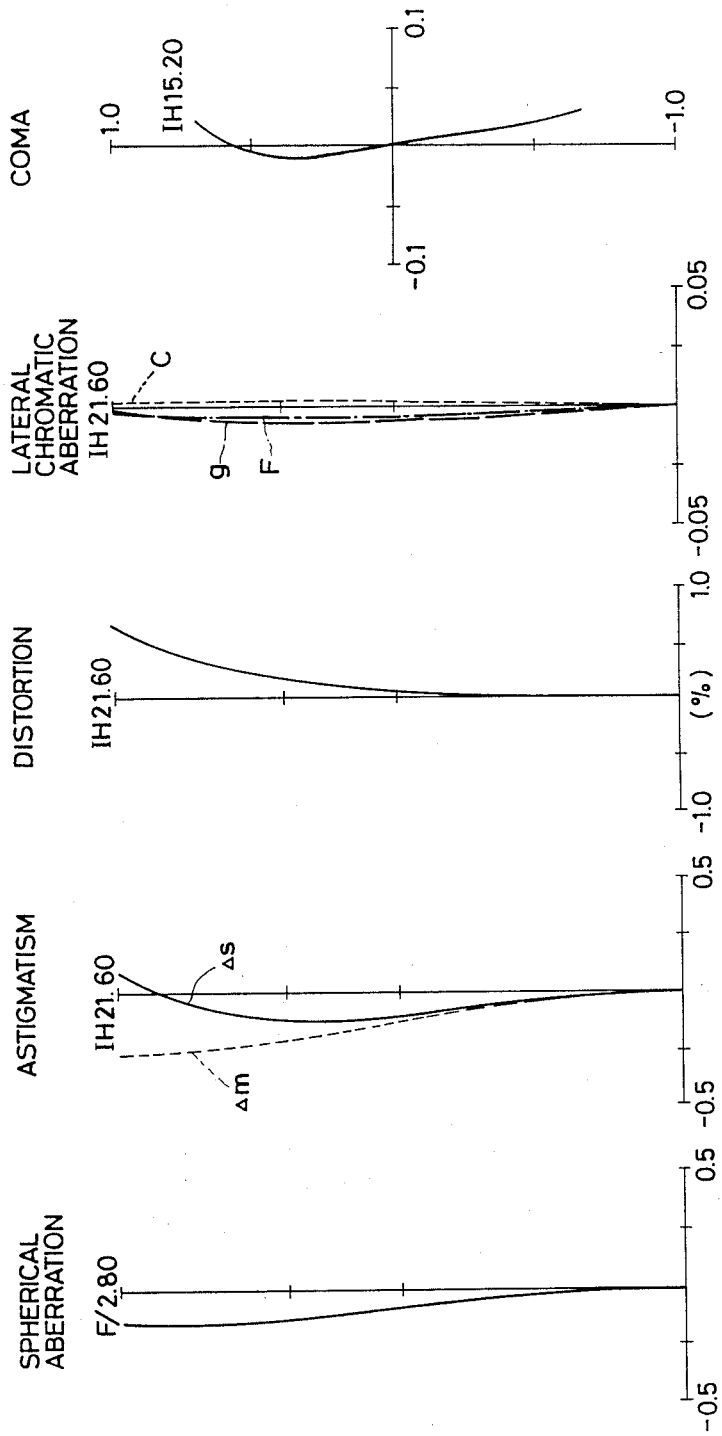
FIGS. 10 through 12 respectively show graphs illustrating aberration curves of Embodiment 3.
Figure 11:
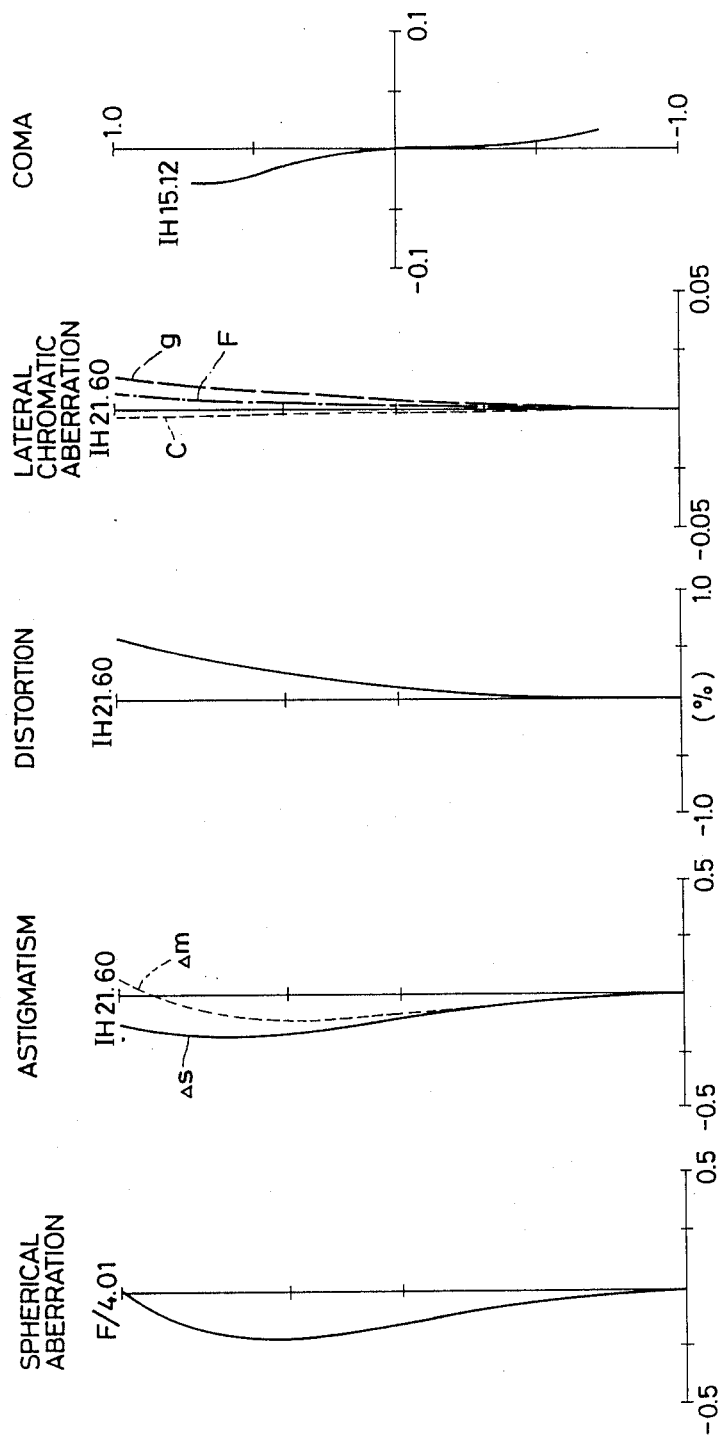
Figure 12:
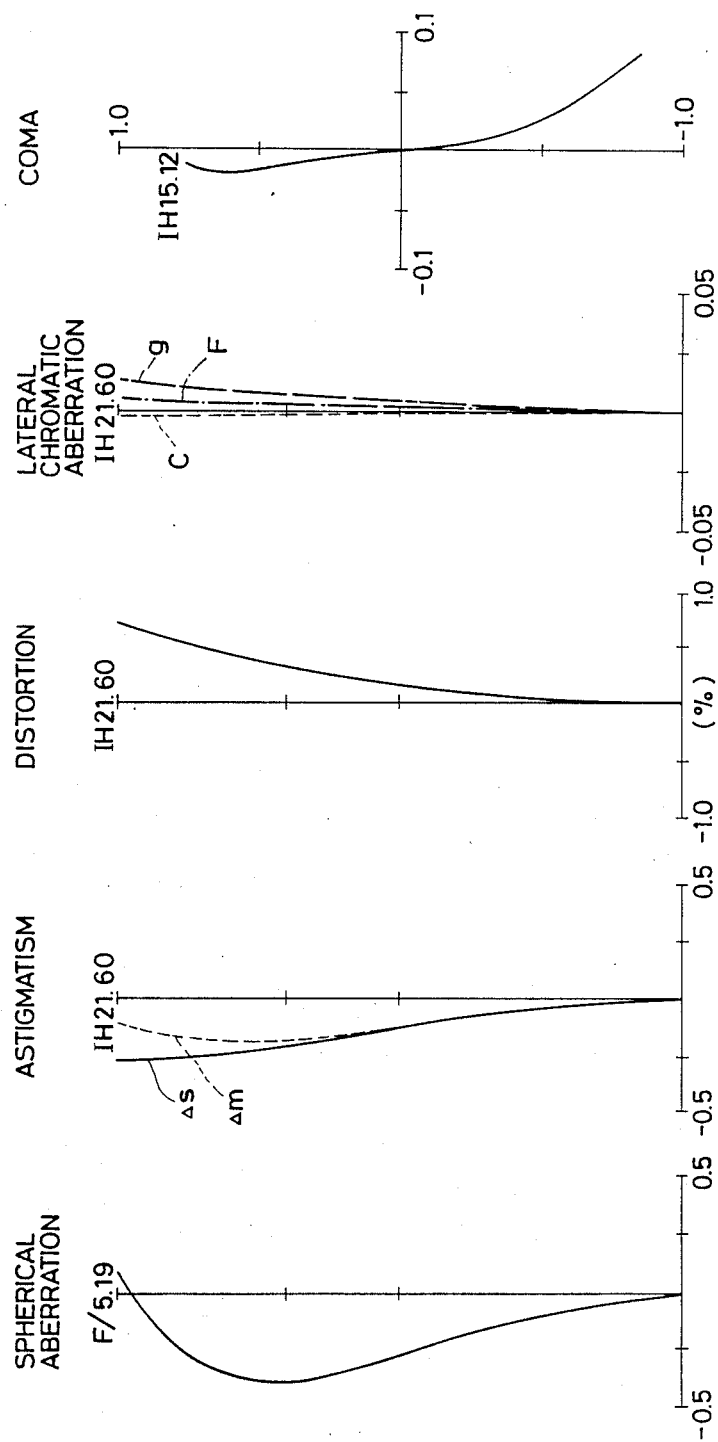
Figure 13:
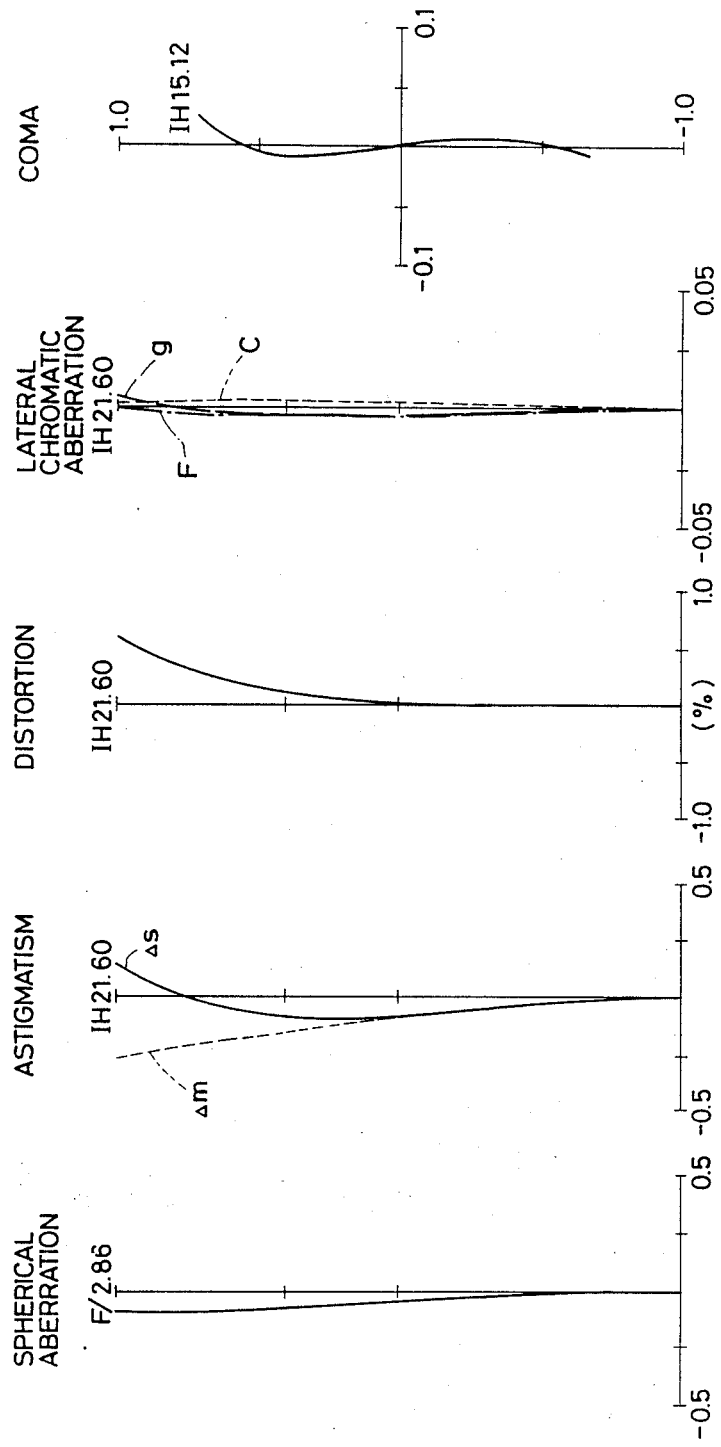
FIGS. 13 through 15 respectively show graphs illustrating aberration curves of Embodiment 4.
Figure 14:
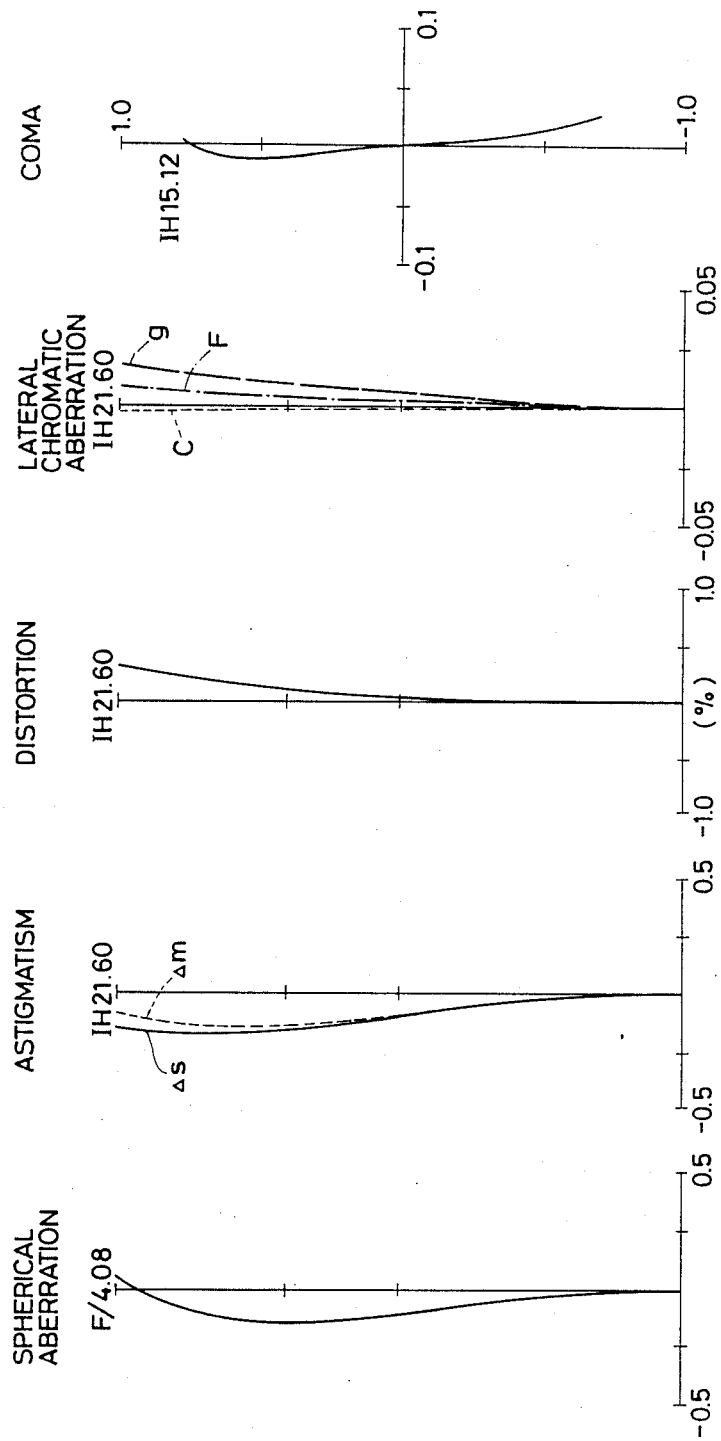
Figure 15:
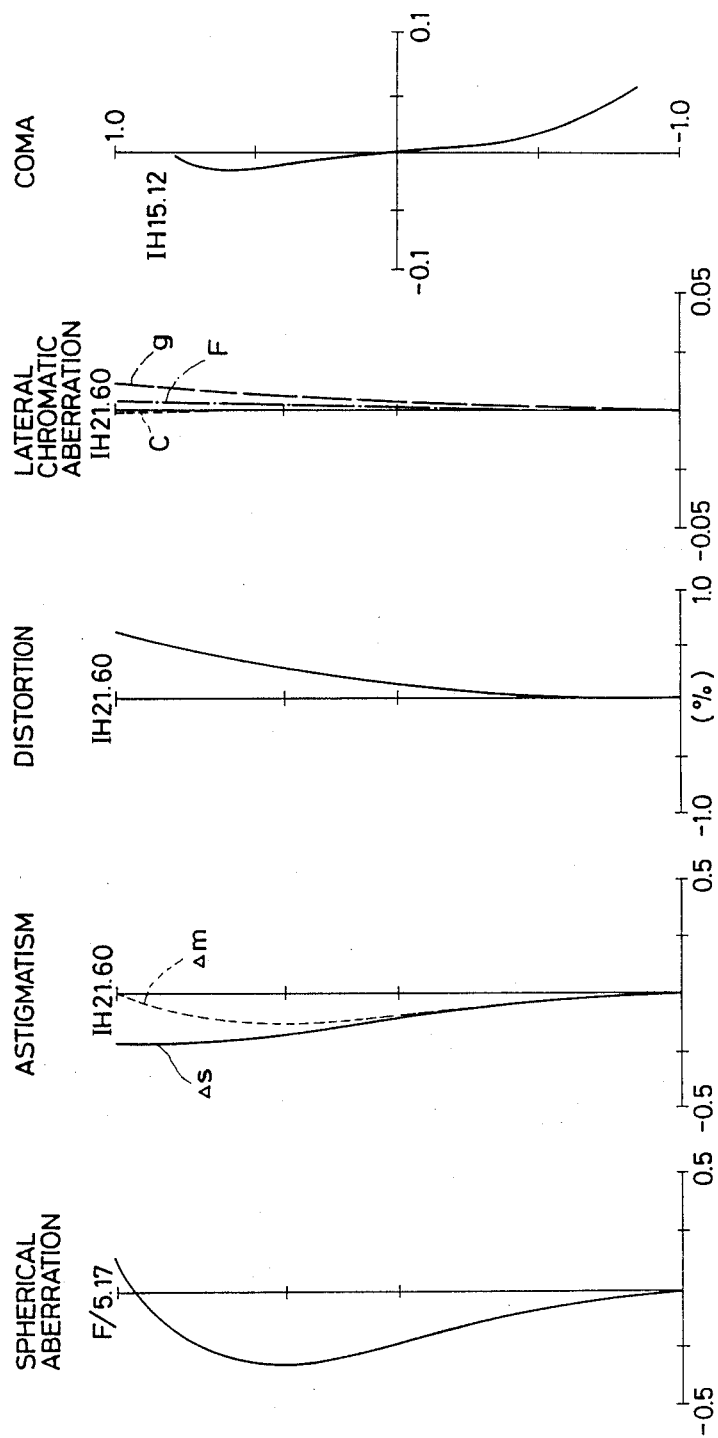
Figure 16:
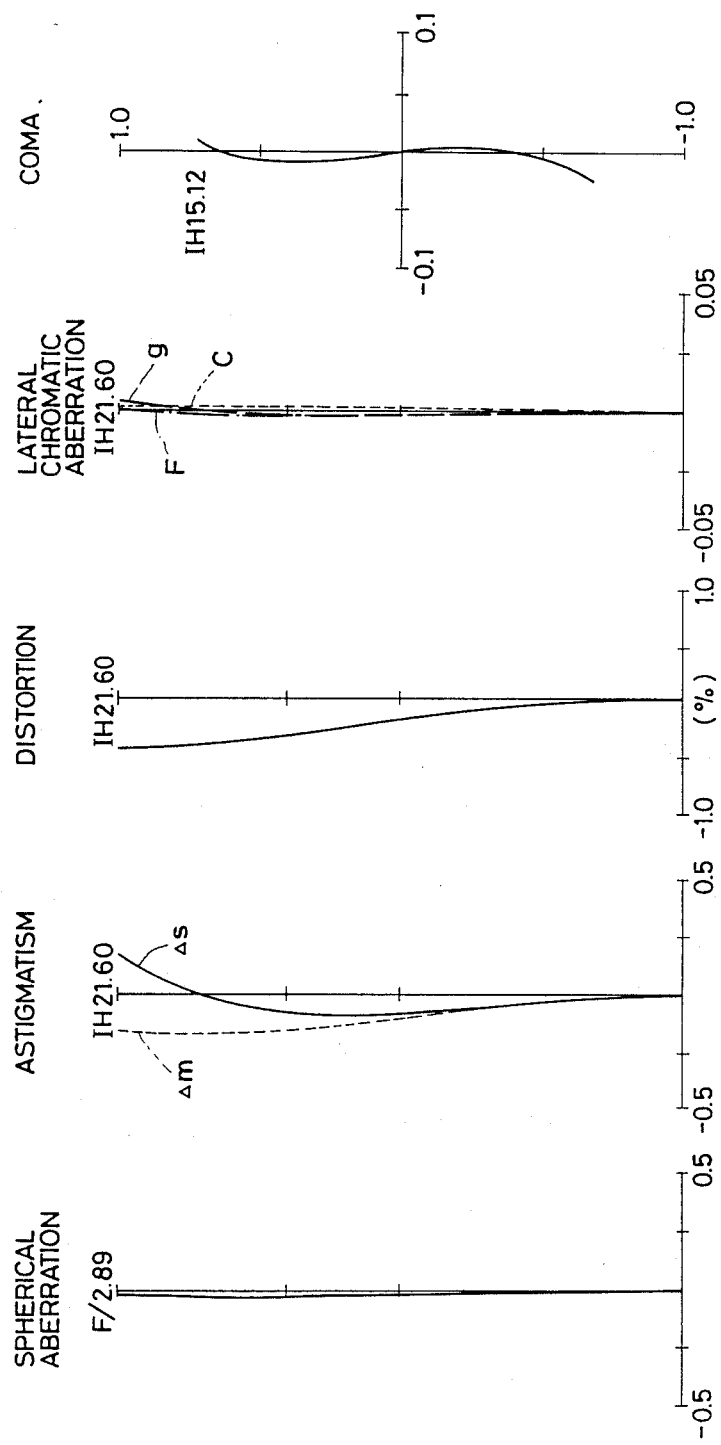
FIGS. 16 through 18 respectively show graphs illustrating aberration curves of Embodiment 5.
Figure 17:
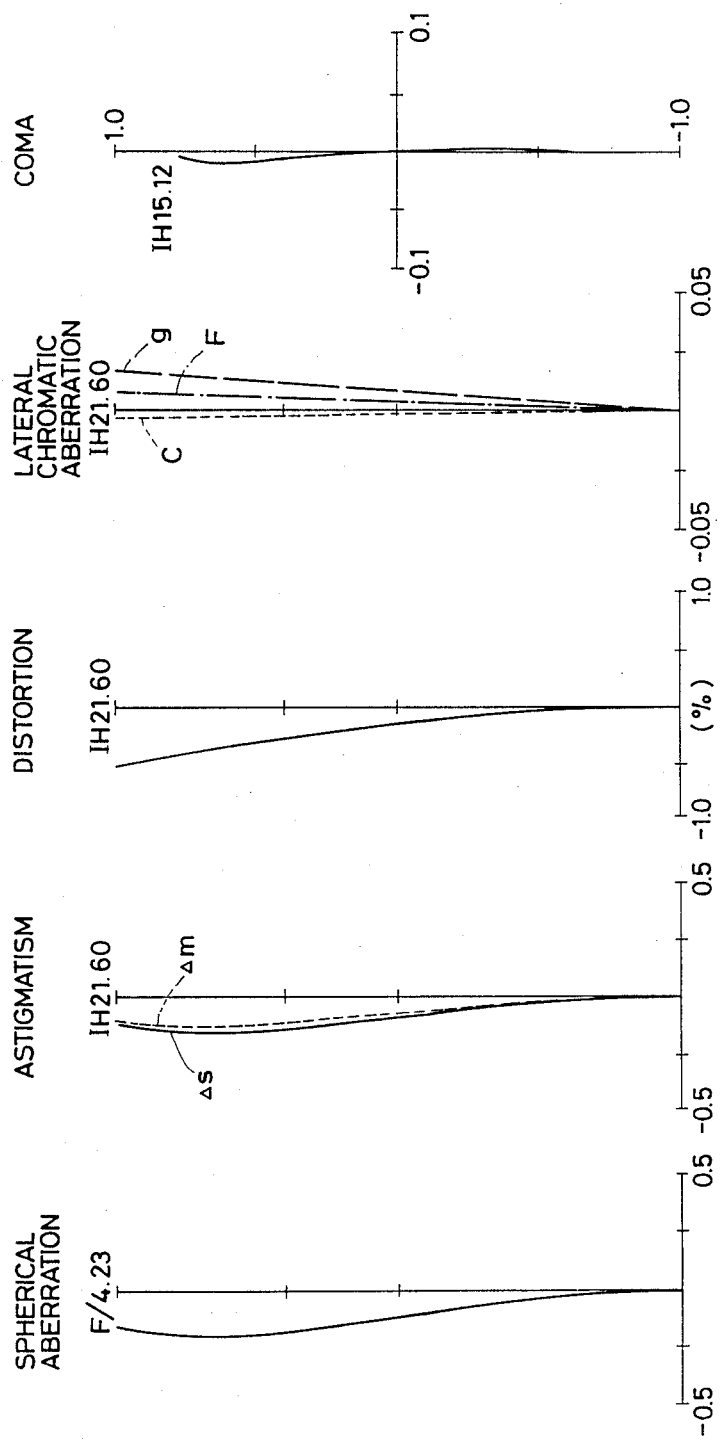
Figure 18:
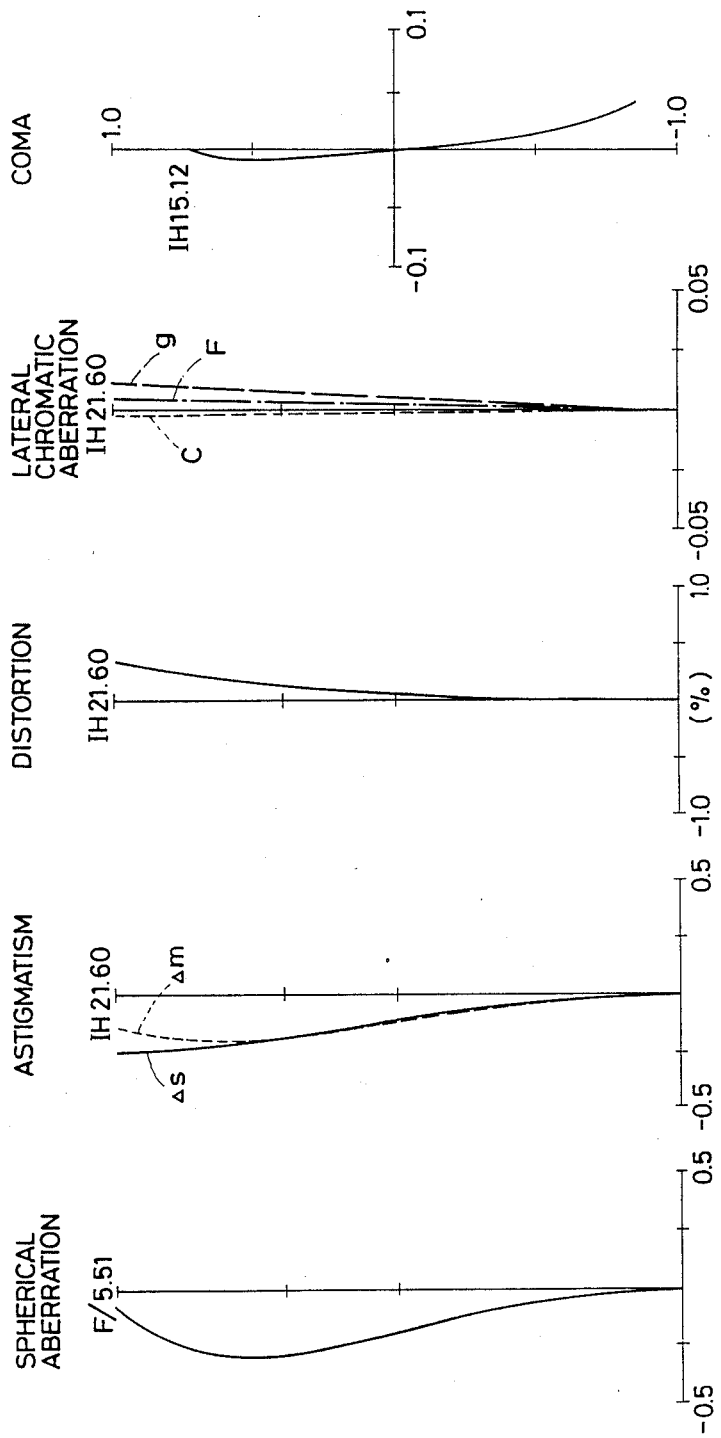
Figure 19:
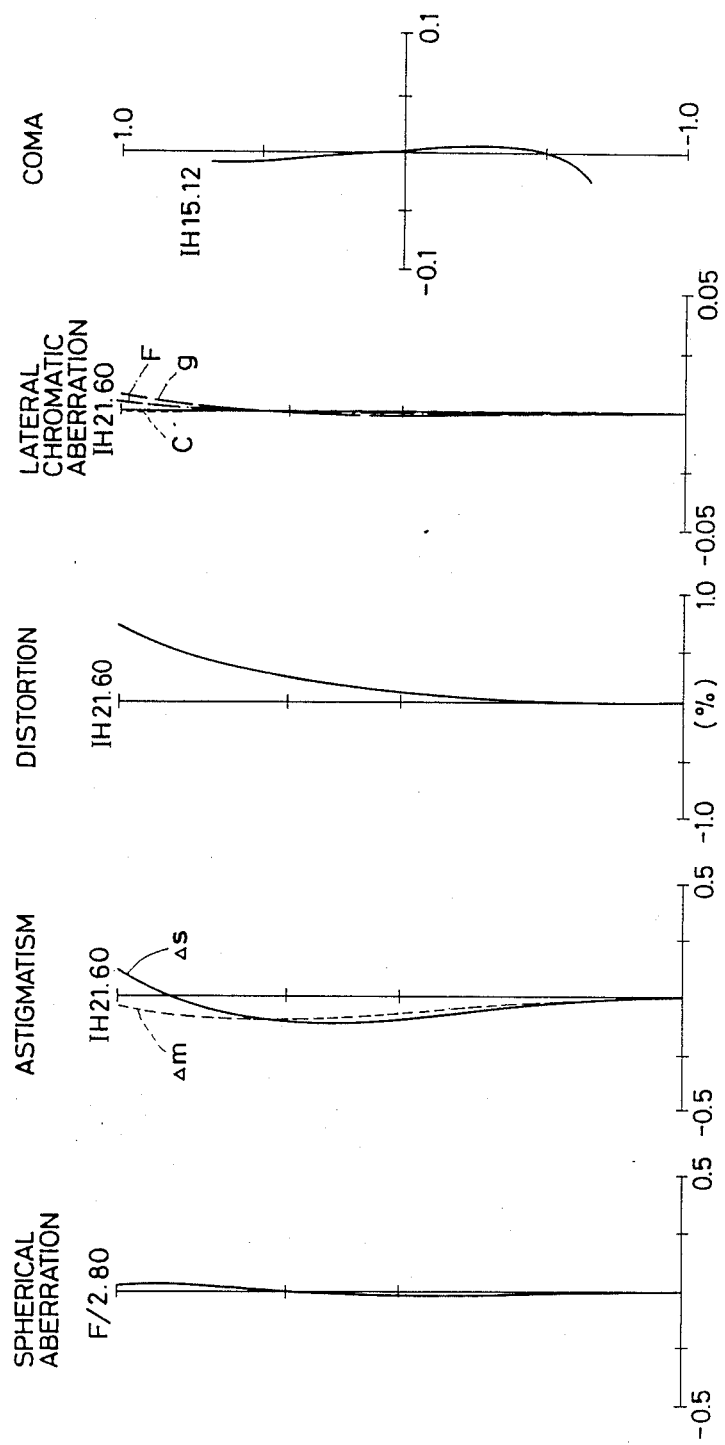
FIGS. 19 through 21 respectively show graphs illustrating aberration curves of Embodiment 6.
Figure 20:
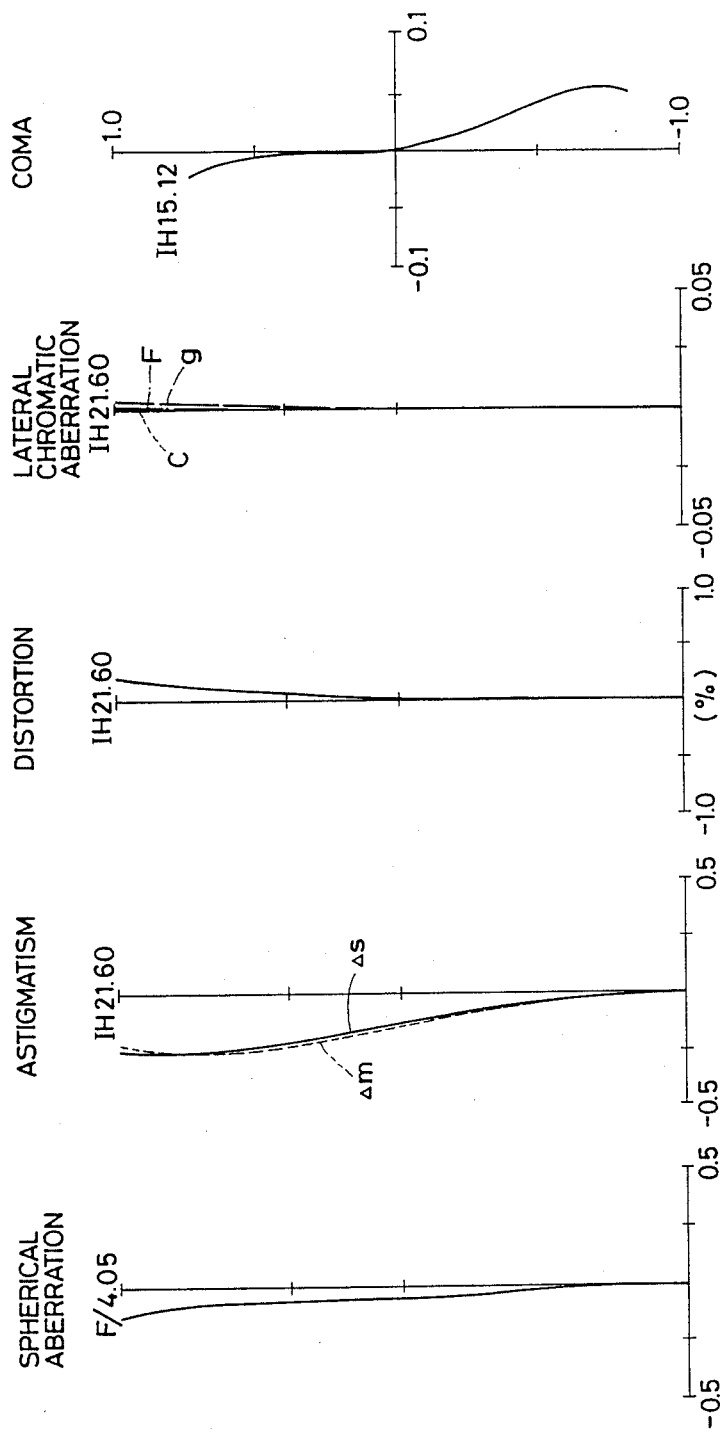
Figure 21:
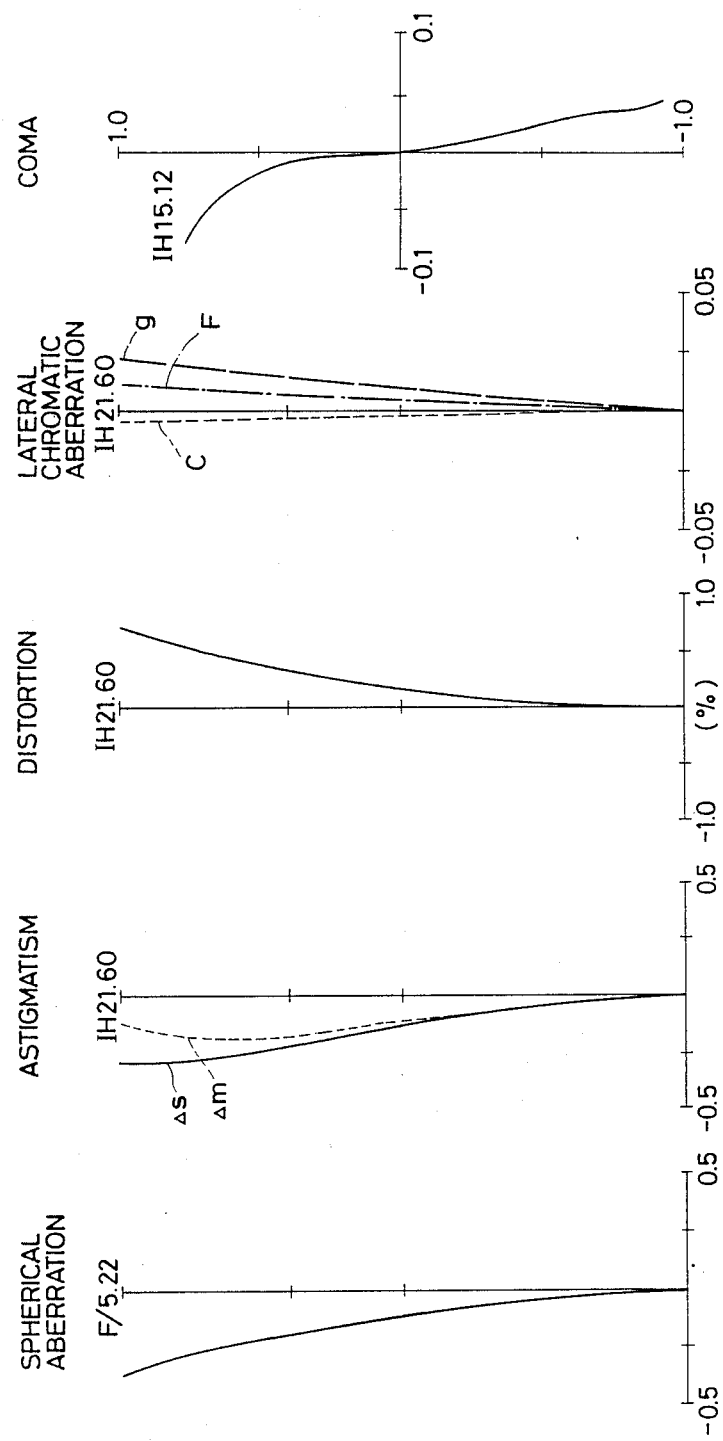

Graphs illustrating aberration curves of Embodiment 1 when focused on an object at the infinite distance, when the photographing magnification is 1/2×, and when the photographing magnification is 1.0× are respectively shown in FIGS. 4, 5 and 6. Graphs illustrating aberration curves of Embodiment 2 when focused on an object at the infinite distance, when the photographing magnification is 1/2×, and when the photographing magnification is 1.0× are respectively shown in FIGS. 7, 8 and 9. Graphs illustrating aberration curves of Embodiment 3 when focused on an object at the infinite distance, when the photographing magnification is 1/2×, and when the photographing magnification is 1.0× are respectively shown in FIGS. 10, 11 and 12. Graphs illustrating aberration curves of Embodiment 4 when focused on an object at the infinite distance, when the photographing magnification is 1/2×, and when the photographing magnification is 1.0× are respectively shown in FIGS. 13, 14 and 15. Graphs illustrating aberration curves of Embodiment 5 when focused on an object at the infinite distance, when the photographing magnification is 1/2×, and when the photographing magnification is 1.0× are respectively shown in FIGS. 16, 17 and 18. Graphs illustrating aberration curves of Embodiment 6 when focused on an object at the infinite distance, when the photographing magnification is 1/2×, and when the photographing magnification is 1.0× are respectively shown in FIGS. 19, 20 and 21.

As described in detail so far, the large-aperture macro lens system according to the present invention is arranged that aberrations are corrected favourably over the whole range of object distance from the infinite distance up to the distance corresponding to the photographing magnification of 1×, variation of aberrations, especially, variation of spherical aberration is small, and quality of image is favourable. Besides, said macro lens system is compact as the lens system advancing amount is small and is bright as the effective F-number at the photographing magnification of 1× is small, i.e., 5.2.

I claim:

1. A large-aperture macro lens systems comprising a first lens group having positive refractive power, a second lens group having positive refractive power, and a third lens group having negative refractive power in the order from the object side, said large-aperture macro lens system being arranged that, when focusing from an infinite distance object to a short distance object is performed, the airspace between said first and second lens groups is varied in a pattern that said airspace is increased and, then, decreased by changing the varying direction near the position of the intermediate photographing magnification.

2. A large-aperture macro lens system according to claim 1 arranged that, when focusing from an infinite distance object to a short distance object is performed the airspace between said second and third lens groups is increased continuously.

3. A large-aperture macro lens system according to claim 2 wherein said first lens group comprises at least one negative lens, said large-aperture macro lens system being arranged to fulfill the following conditions:

(1) $1.7 < |f_3|/f < 10$, $f_3 < 0$    (1)

(2) $0 > \Delta D_1 < 2$    (2)

(3) $\nu_{1n} < 50$    (3)

(4) $n_{3n} < 1.65$    (4)

where, reference symbol f represents the focal length of the lens system as a whole, reference symbol $f_3$ represents the focal length of the third lens group, reference symbol $\Delta D_1$ represents the difference between the largest value of the airspace between the first and second lens groups and value of said airspace when focused on an object at a distance corresponding to the photographing magnification of 1×, reference symbol $\nu_{1n}$ represents Abbe's number of the negative lens comprised in the first lens group, and reference symbol $n_{3n}$ represents the refractive index of the negative lens comprised in the third lens group.

4. A large-aperture macro lens system according to claim 3 further fulfilling the condition (5) shown below:

$0.5 < |r_a|/f - 1.0$    (5)

where, reference symbol $r_a$ represents the radius of curvature of the surface having the strongest diverging action out of respective surfaces in the third lens group.

5. A large-aperture macro lens system according to claim 3 wherein said first lens group comprises at least first and second lens components, further fulfilling the condition (6) shown below:

$1.7 < n_2$    (6)

where, reference symbol $n_2$ represents the refractive index of the second lens component.

6. A large-aperture macro lens system according to claim 3 having the following numerical data:

| $f = 51.5$, | $F/2.80 \sim F/5.10$, | $2\omega = 45.5°$ |
|---|---|---|
| $r_1 = 71.9126$ | | |
| $d_1 = 2.5631$ | $n_1 = 1.72916$ | $\nu_1 = 54.68$ |
| $r_2 = -171.0158$ | | |

-continued

| | | |
|---|---|---|
| $d_2 = 0.1350$ | | |
| $r_3 = 19.7855$ | | |
| $d_3 = 3.1449$ | $n_2 = 1.77250$ | $\nu_2 = 49.66$ |
| $r_4 = 34.9886$ | | |
| $d_4 = 0.7600$ | | |
| $r_5 = 93.2117$ | | |
| $d_5 = 1.2822$ | $n_3 = 1.58267$ | $\nu_3 = 46.33$ |
| $r_6 = 16.3528$ | | |
| $d_6 = D_1$ | | |
| $r_7 = -18.8909$ | | |
| $d_7 = 3.0858$ | $n_4 = 1.75520$ | $\nu_4 = 2.751$ |
| $r_8 = 206.0456$ | | |
| $d_8 = 5.0491$ | $n_5 = 1.77250$ | $\nu_5 = 49.66$ |
| $r_9 = -23.1076$ | | |
| $d_9 = 0.1650$ | | |
| $r_{10} = 47.7170$ | | |
| $d_{10} = 3.2747$ | $n_6 = 1.77250$ | $\nu_6 = 49.66$ |
| $r_{11} = -139.1554$ | | |
| $d_{11} = D_2$ | | |
| $r_{12} = -377.3011$ | | |
| $d_{12} = 1.5000$ | $n_7 = 1.51633$ | $\nu_7 = 64.15$ |
| $r_{13} = 31.4655$ | | |
| $d_{13} = 1.6000$ | | |
| $r_{14} = 315.7777$ | | |
| $d_{14} = 2.6094$ | $n_8 = 1.58267$ | $\nu_8 = 46.33$ |
| $r_{15} = -73.0544$ | | |
| | $D_1$ | $D_2$ |
| Infinit Distance | 6.291 | 0.990 |
| $-0.5X$ | 10.016 | 3.412 |
| $-1.0X$ | 9.016 | 7.868 | the stop is arranged 3 mm in front of the seventh surface $(r_7)$ $|f_3|/f = 2.597$, $\Delta D_1 = 1.081$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

7. A large-aperture macro lens system according to claim 3 having the following numerical data:

| $f = 51.5$, | $F/2.83 \sim F/5.11$, | $2\omega = 45.5°$ |
|---|---|---|
| $r_1 = 70.3184$ | | |
| $d_1 = 2.5451$ | $n_1 = 1.71700$ | $\nu_1 = 47.94$ |
| $r_2 = -153.3443$ | | |
| $d_2 = 0.1350$ | | |
| $r_3 = 19.1789$ | | |
| $d_3 = 3.1500$ | $n_2 = 1.78590$ | $\nu_2 = 44.18$ |
| $r_4 = 34.3091$ | | |
| $d_4 = 0.6800$ | | |
| $r_5 = 83.1414$ | | |
| $d_5 = 1.2990$ | $n_3 = 1.60342$ | $\nu_3 = 38.01$ |
| $r_6 = 15.4390$ | | |
| $d_6 = D_1$ | | |
| $r_7 = -16.4628$ | | |
| $d_7 = 2.5017$ | $n_4 = 1.75520$ | $\nu_4 = 27.51$ |
| $r_8 = -155.4760$ | | |
| $d_8 = 5.0909$ | $n_5 = 1.77250$ | $\nu_5 = 49.66$ |
| $r_9 = -20.4045$ | | |
| $d_9 = 0.1650$ | | |
| $r_{10} = 48.3531$ | | |
| $d_{10} = 3.1648$ | $n_6 = 1.71300$ | $\nu_6 = 53.84$ |
| $r_{11} = -99.7993$ | | |
| $d_{11} = D_2$ | | |
| $r_{12} = 153.8758$ | | |
| $d_{12} = 1.5900$ | $n_7 = 1.60729$ | $\nu_7 = 59.38$ |
| $r_{13} = 30.8977$ | | |
| $d_{13} = 1.8300$ | | |
| $r_{14} = 171.8386$ | | |
| $d_{14} = 2.6597$ | $n_8 = 1.60342$ | $\nu_8 = 38.01$ |

-continued

| f = 51.5, F/2.83~F/5.11, 2ω = 45.5° | | |
|---|---|---|
| $r_{15} = -135.5035$ | | |
|  | $D_1$ | $D_2$ |
| Infinit Distance | 6.900 | 0.727 |
| −0.5X | 10.820 | 2.496 |
| −1.0X | 10.620 | 6.935 | the stop is arranged 3.3 mm in front of the seventh surface ($r_7$)

$|f_3|/f=2.630$, $\Delta D_1=0.389$ where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, and reference symbols $\nu_1$, $\nu_2$, ... respectively represent Abbe's numbers of respective lenses.

8. A large-aperture macro lens system according to claim 3 having the following numerical data:

| f = 51.5, F/2.8~F/5.19, 2ω = 45.5° | | | |
|---|---|---|---|
| $r_1 = 148.9792$ | | | |
| $d_1 = 2.5631$ | $n_1 = 1.72916$ | | $\nu_1 = 54.68$ |
| $r_2 = -100.8477$ | | | |
| $d_2 = 0.1350$ | | | |
| $r_3 = 19.6669$ | | | |
| $d_3 = 3.1449$ | $n_2 = 1.77250$ | | $\nu_2 = 49.66$ |
| $r_4 = 46.5278$ | | | |
| $d_4 = 1.0165$ | | | |
| $r_5 = 370.0493$ | | | |
| $d_5 = 1.2822$ | $n_3 = 1.58267$ | | $\nu_3 = 46.33$ |
| $r_6 = 16.1179$ | | | |
| $d_6 = D_1$ | | | |
| $r_7 = -17.9561$ | | | |
| $d_7 = 2.0000$ | $n_4 = 1.75520$ | | $\nu_4 = 27.51$ |
| $r_8 = -359.3300$ | | | |
| $d_8 = 4.0000$ | $n_5 = 1.77250$ | | $\nu_5 = 49.66$ |
| $r_9 = -21.1552$ | | | |
| $d_9 = 0.1650$ | | | |
| $r_{10} = 58.7760$ | | | |
| $d_{10} = 3.2747$ | $n_6 = 1.77250$ | | $\nu_6 = 49.66$ |
| $r_{11} = -74.8374$ | | | |
| $d_{11} = D_2$ | | | |
| $r_{12} = -303.7594$ | | | |
| $d_{12} = 1.5000$ | $n_7 = 1.51633$ | | $\nu_7 = 64.15$ |
| $r_{13} = 34.8188$ | | | |
| $d_{13} = 1.8245$ | | | |
| $r_{14} = -379.9382$ | | | |
| $d_{14} = 2.5841$ | $n_8 = 1.56732$ | | $\nu_8 = 42.83$ |
| $r_{15} = -57.1724$ | | | |
|  | $D_1$ | $D_2$ | |
| Infinit Distance | 6.291 | 0.990 | |
| −0.5X | 10.152 | 4.715 | |
| −1.0X | 10.127 | 8.399 | | the stop is arranged 3 mm in front of the seventh surface ($r_7$)

$|f_3|/f=2.569$, $\Delta D_1=0.327$ where, reference symbols $r_1$,$r_2$ ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, and reference symbols $\nu_1$, $\nu_2$, ... respectively represent Abbe's numbers of respective lenses.

9. A large-aperture macro lens system according to claim 3 having the following numerical data:

| f = 51.5, F/2.86~F/5.17, 2ω = 45.5° | | | |
|---|---|---|---|
| $r_1 = 61.2176$ | | | |
| $d_1 = 2.5000$ | $n_1 = 1.72000$ | | $\nu_1 = 50.25$ |
| $r_2 = -213.6049$ | | | |
| $d_2 = 0.1500$ | | | |
| $r_3 = 18.2860$ | | | |
| $d_3 = 3.0000$ | $n_2 = 1.78590$ | | $\nu_2 = 44.18$ |
| $r_4 = 29.1936$ | | | |
| $d_4 = 0.7200$ | | | |
| $r_5 = 60.8301$ | | | |
| $d_5 = 1.2400$ | $n_3 = 1.58144$ | | $\nu_3 = 40.75$ |
| $r_6 = 14.7356$ | | | |
| $d_6 = D_1$ | | | |
| $r_7 = -18.2868$ | | | |
| $d_7 = 2.7400$ | $n_4 = 1.76180$ | | $\nu_4 = 27.11$ |
| $r_8 = 278.6021$ | | | |
| $d_8 = 5.3000$ | $n_5 = 1.77250$ | | $\nu_5 = 49.66$ |
| $r_9 = -22.8068$ | | | |
| $d_9 = 0.1500$ | | | |
| $r_{10} = 43.1647$ | | | |
| $d_{10} = 2.9111$ | $n_6 = 1.72000$ | | $\nu_6 = 50.25$ |
| $r_{11} = -122.2355$ | | | |
| $d_{11} = D_2$ | | | |
| $r_{12} = -5146.8708$ | | | |
| $d_{12} = 1.4000$ | $n_7 = 1.51633$ | | $\nu_7 = 64.15$ |
| $r_{13} = 30.3529$ | | | |
| $d_{13} = 2.0800$ | | | |
| $r_{14} = -398.4014$ | | | |
| $d_{14} = 2.4100$ | $n_8 = 1.58144$ | | $\nu_8 = 40.75$ |
| $r_{15} = -53.6950$ | | | |
|  | $D_1$ | $D_2$ | |
| Infinit Distance | 6.900 | 0.727 | |
| −0.5X | 10.589 | 2.336 | |
| −1.0X | 9.990 | 6.107 | | the stop is arranged 3.3 mm in front of seventh surface ($r_7$)

$|f_3|/f=2.734$, $\Delta D_1=0.721$ where, reference symbols $r_1$, $R_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, and reference symbols $\nu_1$, $\nu_2$, ... respectively represent Abbe's numbers of respective lenses.

10. A large-aperture macro lens system according to claim 3 having the following numerical data:

| f = 51.5, F/2.89~F/5.51, 2ω = 45.5° | | | |
|---|---|---|---|
| $r_1 = 107.4559$ | | | |
| $d_1 = 2.5631$ | $n_1 = 1.72916$ | | $\nu_1 = 54.68$ |
| $r_2 = -134.0176$ | | | |
| $d_2 = 0.135$ | | | |
| $r_3 = 18.5240$ | | | |
| $d_3 = 3.1449$ | $n_2 = 1.77250$ | | $\nu_2 = 49.66$ |
| $r_4 = 35.1161$ | | | |
| $d_4 = 0.8000$ | | | |
| $r_5 = 131.5691$ | | | |
| $d_5 = 1.2822$ | $n_3 = 1.58267$ | | $\nu_3 = 46.33$ |
| $r_6 = 15.8882$ | | | |
| $d_6 = D_1$ | | | |
| $r_7 = -15.1976$ | | | |
| $d_7 = 1.8825$ | $n_4 = 1.75520$ | | $\nu_4 = 27.51$ |
| $r_8 = -359.3300$ | | | |
| $d_8 = 3.5481$ | $n_5 = 1.78590$ | | $\nu_5 = 44.18$ |
| $r_9 = -17.9921$ | | | |
| $d_9 = 0.1650$ | | | |
| $r_{10} = 80.9828$ | | | |
| $d_{10} = 3.2747$ | $n_6 = 1.77250$ | | $\nu_6 = 49.66$ |
| $r_{11} = -102.7116$ | | | |
| $d_{11} = D_2$ | | | |
| $r_{12} = 102.5518$ | | | |
| $d_{12} = 1.5000$ | $n_7 = 1.51633$ | | $\nu_7 = 64.15$ |
| $r_{13} = 38.6024$ | | | |

-continued

| f = 51.5, F/2.89~F/5.51, 2ω = 45.5° | | | |
|---|---|---|---|
| $d_{13} = 1.0000$ | | | |
| $r_{14} = 160.0516$ | | | |
| $d_{14} = 2.5841$ | | $n_8 = 1.56732$ | $\nu_8 = 42.83$ |
| $r_{15} = -231.2026$ | | | |
| | $D_1$ | $D_2$ | |
| Infinit Distance | 9.900 | 1.533 | |
| −0.5X | 11.247 | 3.259 | |
| −1.0X | 10.248 | 14.177 | | the stop is arranged 3.3 mm in front of the seventh surface ($r_7$)

$|f_3|/f = 8.680$, $\Delta D_1 = 1.359$ where, reference symbols $r_1$, $r_2$, . . . respectively represent radii of curvature of respective lens surfaces, reference symbols $d_1$, $d_2$, . . . respectively represent thicknesses of respective lenses and airspaces between respective lenses, reference symbols $n_1$, $n_2$, . . . respectively represent refractive indices of respective lenses, and reference symbols $\nu_1$, $\nu_2$, . . . respectively represent Abbe's numbers of respective lenses.

11. A large-aperture macro lens system according to claim 3 having the following numerical data:

| f = 51.5, F/2.8~F/5.22, 2ω = 45.5° | | | |
|---|---|---|---|
| $r_1 = 40.5017$ | | | |
| $d_1 = 3.6069$ | | $n_1 = 1.72916$ | $\nu_1 = 54.68$ |
| $r_2 = 1165.0549$ | | | |
| $d_2 = 0.1350$ | | | |
| $r_3 = 18.9963$ | | | |
| $d_3 = 3.1449$ | | $n_2 = 1.77250$ | $\nu_2 = 49.66$ |
| $r_4 = 29.6782$ | | | |

-continued

| f = 51.5, F/2.8~F/5.22, 2ω = 45.5° | | | |
|---|---|---|---|
| $d_4 = 1.4000$ | | | |
| $r_5 = 90.0652$ | | | |
| $d_5 = 1.7000$ | | $n_3 = 1.65016$ | $\nu_3 = 39.39$ |
| $r_6 = 12.8155$ | | | |
| $d_6 = D_1$ | | | |
| $r_7 = -11.5012$ | | | |
| $d_7 = 1.8500$ | | $n_4 = 1.80518$ | $\nu_4 = 25.43$ |
| $r_8 = -14.3165$ | | | |
| $d_8 = 0.1500$ | | | |
| $r_9 = 62.8013$ | | | |
| $d_9 = 4.0000$ | | $n_5 = 1.72916$ | $\nu_5 = 54.68$ |
| $r_{10} = -24.7292$ | | | |
| $d_{10} = D_2$ | | | |
| $r_{11} = -118.5352$ | | | |
| $d_{11} = 1.4000$ | | $n_6 = 1.58144$ | $\nu_6 = 40.75$ |
| $r_{12} = 31.9202$ | | | |
| $d_{12} = 1.6000$ | | | |
| $r_{13} = -392.9991$ | | | |
| $d_{13} = 3.1440$ | | $n_7 = 1.58913$ | $\nu_7 = 60.97$ |
| $r_{14} = -37.2800$ | | | |
| | $D_1$ | $D_2$ | |
| Infinit Distance | 8.302 | 0.600 | |
| −0.5X | 8.823 | 2.417 | |
| −1.0X | 8.802 | 6.206 | | the stop is arranged 4 mm in front of the seventh surface ($r_7$)

$|f_3|/f = 2.579$, $\Delta D_1 = 0.128$ where, reference symbols $r_1$, $r_2$, . . . respectively represent radii of curvature of respective lens surfaces, reference symbols $d_1$, $d_2$, . . . respectively represent thicknesses of respective lenses and airspaces between respective lenses, reference symbols $n_1$, $n_2$, . . . respectively represent refractive indices of respective lenses, and reference symbols $\nu_1$, $\nu_2$, . . . respectively represent Abbe's numbers of respective lenses.

* * * * *